United States Patent
Agrawal et al.

(10) Patent No.: US 10,701,531 B2
(45) Date of Patent: Jun. 30, 2020

(54) ENVIRONMENTAL SENSING WITH WIRELESS COMMUNICATION DEVICES

(71) Applicant: QUALCOMM Incorporated, San Diego, CA (US)

(72) Inventors: Meghna Agrawal, Cupertino, CA (US); Sai Pradeep Venkatraman, Santa Clara, CA (US); Weihua Gao, San Jose, CA (US); Ju-Yong Do, Cupertino, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/673,247

(22) Filed: Aug. 9, 2017

(65) Prior Publication Data

US 2019/0052995 A1    Feb. 14, 2019

(51) Int. Cl.
| | |
|---|---|
| *H04W 4/38* | (2018.01) |
| *H04W 8/00* | (2009.01) |
| *H04W 8/18* | (2009.01) |
| *H04W 4/80* | (2018.01) |
| *H04W 84/18* | (2009.01) |
| *H04W 4/70* | (2018.01) |
| *G01S 5/02* | (2010.01) |
| *H04W 4/02* | (2018.01) |
| *H04B 17/30* | (2015.01) |

(52) U.S. Cl.
CPC ............ *H04W 4/38* (2018.02); *G01S 5/0252* (2013.01); *H04B 17/30* (2015.01); *H04W 4/023* (2013.01); *H04W 4/80* (2018.02); *H04W 8/005* (2013.01); *H04W 8/18* (2013.01); *H04W 4/70* (2018.02); *H04W 84/18* (2013.01)

(58) Field of Classification Search
None
See application file for complete search history.

(56) References Cited

U.S. PATENT DOCUMENTS

| | | |
|---|---|---|
| 7,843,327 B1 | 11/2010 | DiMartino et al. |
| 9,372,922 B2 | 6/2016 | Shaashua et al. |
| 9,756,547 B2* | 9/2017 | Egner .................. H04W 4/029 |
| 2010/0317371 A1 | 12/2010 | Westerinen et al. |
| 2015/0195365 A1 | 7/2015 | Choi et al. |
| 2015/0324698 A1 | 11/2015 | Karaoguz et al. |
| 2015/0350228 A1 | 12/2015 | Baxley et al. |
| 2015/0358777 A1 | 12/2015 | Gupta |
| 2017/0171314 A1* | 6/2017 | Britt .................... H04L 63/0428 |

FOREIGN PATENT DOCUMENTS

WO    2016187298 A1    11/2016

OTHER PUBLICATIONS

International Search Report and Written Opinion—PCT/US2018/036193—ISA/EPO—dated Aug. 13, 2018.

* cited by examiner

*Primary Examiner* — Mohammed Rachedine
(74) *Attorney, Agent, or Firm* — Thien T. Nguyen

(57) ABSTRACT

A method of using one or more radio-frequency signals includes: monitoring, with at least one radio-frequency (RF) receiver, one or more RF characteristics of one or more wireless RF signals from one or more RF devices in an environment; comparing the one or more RF characteristics to a reference RF profile for the environment; and initiating an action based on a difference between the one or more RF characteristics and the reference RF profile determined by the comparing.

57 Claims, 11 Drawing Sheets

| | 118 | 120 | 122 | 124 | 126 | 128 | 130 | 132 |
|---|---|---|---|---|---|---|---|---|
| | Device type | Device name/ID | Mobility | First position | First Pos Unc | Second position | Second Pos Unc | Second angle of arrival |
| 112 → Attribute | | | | | | | | |
| 114 → Value | Refrigerator | Frigid | Stationary | ENU=[0, 0, 0] m | 0 m | 2.3 m | 0.1 m | 43° |
| 116 → Public (0) / private (1) | 0 | 0 | 0 | 0 | 0 | 0 | 0 | 0 |

FIG. 4 (110)

| | 158 | 160 | 162 | 164 | 166 |
|---|---|---|---|---|---|
| | Device type | Device name/ID | Mobility | First position | First Pos Unc |
| 152 → Attribute | | | | | |
| 154 → Value | Mobile phone | Eldest child's phone | Mobile | LLA=[37.8°, -122.4°, 80m] | 200 m |
| 156 → Public (0) / private (1) | 0 | 0 | 0 | 1 | 1 |

FIG. 5 (150)

ENVIRONMENTAL SENSING WITH WIRELESS COMMUNICATION DEVICES

BACKGROUND

Devices, both mobile and static, are increasingly equipped to wirelessly communicate with other devices and/or to take measurements from which their locations may be determined and/or locations may be determined of other devices from which one or more signals are received. Locations of devices may be determined by the devices themselves, or by another device that is provided with the measurements, or by another device that takes the measurements. For example, a device may determine its own location based on satellite positioning system (SPS) signals, cellular network signals, and/or Wi-Fi signals, etc. that the devices receive. Also or alternatively, the location of a target device may be determined by another to which measurements taken by the target device are provided. Also or alternatively, the location of the target device may be determined by location-determining device based on measurements of signals sent by the target device (received by the location-determining device and/or received by one or more other devices). The types of devices that are capable of wirelessly communicating continue to expand, for example with household items such as garage door openers often capable of wirelessly communicating with other devices.

SUMMARY

An example of a method of using one or more radio-frequency signals includes: monitoring, with at least one radio-frequency (RF) receiver, one or more RF characteristics of one or more wireless RF signals from one or more RF devices in an environment; comparing the one or more RF characteristics to a reference RF profile for the environment; and initiating an action based on a difference between the one or more RF characteristics and the reference RF profile determined by the comparing.

Implementations of such a method may include one or more of the following features. The method further includes determining that a context of the one or more RF characteristics corresponds to a context of the reference RF profile, wherein comparing the one or more RF characteristics to the reference RF profile is performed in response to determining that the context of the one or more RF characteristics corresponds to the context of the reference RF profile. Determining the context of the one or more RF characteristics includes determining one or more of a time of day, a day of the week, a location, a user activity, or presence of a user. The method further includes: providing an indication of the context of the reference RF profile to a user of a receiving wireless communication device that includes the at least one RF receiver; or taking a user-defined action based on the context of the reference RF profile; or a combination of these.

Also or alternatively, implementations of such a method may include one or more of the following features. The one or more RF characteristics and the reference RF profile have a shared RF characteristic set that includes at least one signal characteristic, or at least one signal propagation characteristic, or a combination thereof. Initiating the action occurs in response to the difference determined by the comparing being more than a threshold amount. The action includes requesting a neighbor wireless communication device to determine a confirmation RF profile of one or more of the one or more RF characteristics of one or more of the one or more RF devices, the neighbor wireless communication device being within communication range of the at least one RF receiver. The method further includes maintaining the reference RF profile by updating the reference RF profile using one or more values of the one or more RF characteristics.

An example of a wireless mobile communication device includes: a memory; a transceiver; and a processor communicatively coupled to the memory and to the transceiver and configured to: monitor, via at least one radio-frequency (RF) receiver of the transceiver, one or more RF characteristics of one or more wireless RF signals from one or more RF devices in an environment; compare the one or more RF characteristics to a reference RF profile for the environment; and initiate an action based on a difference between the one or more RF characteristics and the reference RF profile.

Implementations of such a device may include one or more of the following features. The processor is further configured to determine that a context of the one or more RF characteristics corresponds to a context of the reference RF profile, and the processor is configured to compare the one or more RF characteristics to the reference RF profile in response to determining that the context of the one or more RF characteristics corresponds to the context of the reference RF profile. To determine the context of the one or more RF characteristics the processor is configured to determine one or more of a time of day, a day of the week, a location, a user activity, or presence of a user. The processor is further configured to: provide an indication of the context of the reference RF profile to a user of the wireless mobile communication device; or take a user-defined action based on the context of the reference RF profile; or a combination of these.

Also or alternatively, implementations of such a device may include one or more of the following features. The processor is configured to select the reference RF profile for comparison to the one or more RF characteristics such that the one or more RF characteristics and the reference RF profile have a shared RF characteristic set that includes at least one signal characteristic, or at least one signal propagation characteristic, or a combination thereof. The processor is configured to initiate the action in response to the difference between the one or more RF characteristics and the reference RF profile being more than a threshold amount. The action includes requesting a neighbor wireless communication device to determine a confirmation RF profile of one or more of the one or more RF characteristics of one or more of the one or more RF devices. The processor is further configured to maintain the reference RF profile by updating the reference RF profile using one or more values of the one or more RF characteristics.

Another example of a wireless mobile communication device includes: means for monitoring one or more radio-frequency (RF) characteristics of one or more wireless RF signals from one or more RF devices in an environment; means for comparing the one or more RF characteristics to a reference RF profile for the environment; and means for initiating an action based on a difference between the one or more RF characteristics and the reference RF profile determined by the comparing.

Implementations of such a device may include one or more of the following features. The device further includes means for determining that a context of the one or more RF characteristics corresponds to a context of the reference RF profile, wherein the means for comparing are configured to compare the one or more RF characteristics to the reference RF profile in response to the means for determining that the context of the one or more RF characteristics corresponds to the context of the reference RF profile. The means for determining the context of the one or more RF characteristics are configured to determine one or more of a time of day, a day of the week, a location, a user activity, or presence of a user. The device further includes: means for providing an indication of the context of the reference RF profile to a user of the wireless mobile communication device; or means for taking a user-defined action based on the context of the reference RF profile; or a combination of these.

Also or alternatively, implementations of such a device may include one or more of the following features. The device further includes means for selecting the reference RF profile for comparison to the one or more RF characteristics such that the one or more RF characteristics and the reference RF profile have a shared RF characteristic set that includes at least one signal characteristic, or at least one signal propagation characteristic, or a combination thereof. The means for initiating are configured to initiate the action occurs in response to the difference determined by the comparing being more than a threshold amount. The means for initiating the action are configured to request a neighbor wireless communication device to determine a confirmation RF profile of one or more of the one or more RF characteristics of one or more of the one or more RF devices. The device further includes means for maintaining the reference RF profile by updating the reference RF profile using one or more values of the one or more RF characteristics.

An example of a non-transitory, processor-readable storage medium includes instructions configured to cause a processor to: monitor, via at least one radio-frequency (RF) receiver, one or more RF characteristics of one or more wireless RF signals from one or more RF devices in an environment; compare the one or more RF characteristics to a reference RF profile for the environment; and initiate an action based on a difference between the one or more RF characteristics and the reference RF profile.

Implementations of such a storage medium may include one or more of the following features. The storage medium further includes instructions configured to cause the processor to determine that a context of the one or more RF characteristics corresponds to a context of the reference RF profile, wherein the instructions configured to cause the processor to compare the one or more RF characteristics to the reference RF profile are configured to cause the processor to compare the one or more RF characteristics to the reference RF profile in response to the processor determining that the context of the one or more RF characteristics corresponds to the context of the reference RF profile. The instructions configured to cause the processor to determine the context of the one or more RF characteristics are configured to cause the processor to determine one or more of a time of day, a day of the week, a location, a user activity, or presence of a user. The storage medium further includes instructions configured to cause the processor to: provide an indication of the context of the reference RF profile to a user of the wireless mobile communication device; or take a user-defined action based on the context of the reference RF profile; or a combination of these.

Also or alternatively, implementations of such a storage medium may include one or more of the following features. The storage medium further includes instructions configured to cause the processor to select the reference RF profile for comparison to the one or more RF characteristics such that the one or more RF characteristics and the reference RF profile have a shared RF characteristic set that includes at least one signal characteristic, or at least one signal propagation characteristic, or a combination thereof. The instructions configured to cause the processor to initiate the action are configured to cause the processor to initiate the action in response to the difference between the one or more RF characteristics and the reference RF profile being more than a threshold amount. The action includes requesting a neighbor wireless communication device to determine a confirmation RF profile of one or more of the one or more RF characteristics of one or more of the one or more RF devices. The storage medium further includes instructions configured to cause the processor to maintain the reference RF profile by updating the reference RF profile using one or more values of the one or more RF characteristics.

An example of a method of generating a radio-frequency signal profile includes: receiving indications of measurements of one or more values of one or more radio-frequency (RF) characteristics of one or more wireless RF signals from one or more RF devices in an environment; determining contexts from values of one or more context characteristics associated with the measurements; and generating a reference RF profile by combining sets of the one or more values of the one or more RF characteristics associated with similar contexts.

Implementations of such a method may include one or more of the following features. The method further includes maintaining the reference RF profile by updating the reference RF profile using one or more present values of the one or more RF characteristics. Updating the reference RF profile is performed in response to: the one or more of the present values of the one or more RF characteristics differing from the reference RF profile by more than a threshold for more than a specified time; at least one of the RF devices moving more than a respective threshold distance; a present context corresponding to present values of the context characteristics being less than a threshold likeliness of being a previously-determined context; or a present RF profile, corresponding to the one or more present values of the RF characteristics, differing by more than a first threshold amount from the reference RF profile and less than a second threshold amount from a previously-determined present RF profile that also differed from the reference RF profile by more than the first threshold amount; or a combination of two or more of these. The context characteristics include one or more of a time of day, a day of the week, a location, a user activity, or presence of a user. The method further includes sending, using a short-range wireless communication technique, the one or more values of the one or more RF characteristics, one or more values of one or more RF characteristics of the reference RF profile, or a combination of these, directly between wireless communication devices each configured to determine the one or more values of the one or more RF characteristics. Receiving the indications of the measurement includes taking the measurements with at least one radio-frequency (RF) receiver.

An example of a device includes: a memory; a processor, communicatively coupled to the memory, configured to: receive indications of measurements of one or more values of one or more wireless radio-frequency (RF) characteristics of one or more wireless RF signals from one or more RF devices in an environment; determine contexts from values of one or more context characteristics associated with the measurements; and generate a reference RF profile by combining sets of the one or more values of the one or more RF characteristics associated with similar contexts.

Implementations of such a device may include one or more of the following features. The processor is further configured to maintain the reference RF profile by updating the reference RF profile using one or more new values of the one or more RF characteristics. The processor is configured to update the reference RF profile in response to: the one or more of the new values of the one or more RF characteristics differing from the reference RF profile by more than a threshold for more than a specified time; at least one of the RF devices moving more than a respective threshold distance; a new context corresponding to new values of the context characteristics being less than a threshold likeliness of being a previously-determined context; or a new RF profile, corresponding to the one or more new values of the RF characteristics, differing by more than a first threshold amount from the reference RF profile and less than a second threshold amount from a previously-determined present RF profile that also differed from the reference RF profile by more than the first threshold amount; or a combination of two or more of these. The context characteristics include one or more of a time of day, a day of the week, a location, a user activity, or presence of a user. The device further includes a transmitter communicatively coupled to the processor, wherein the processor is further configured to send, via the transmitter using a short-range wireless communication technique, the one or more values of the one or more RF characteristics, one or more values of one or more RF characteristics of the reference RF profile, or a combination of these, directly to a wireless communication device. The device further includes at least one RF receiver communicatively coupled to the processor, wherein the processor is configured to receive the indications of the measurements via the at least one RF receiver.

Another example of a device includes: means for receiving indications of measurements of one or more values of one or more radio-frequency (RF) characteristics of one or more wireless RF signals from one or more RF devices in an environment; means for determining contexts from values of one or more context characteristics associated with the measurements; and means for generating a reference RF profile by combining sets of the one or more values of the one or more RF characteristics associated with similar contexts.

Implementations of such a device may include one or more of the following features. The device further includes means for maintaining the reference RF profile by updating the reference RF profile using one or more present values of the one or more RF characteristics. The means for updating the reference RF profile are configured to update the reference RF profile in response to: the one or more of the present values of the one or more RF characteristics differing from the reference RF profile by more than a threshold for more than a specified time; at least one of the RF devices moving more than a respective threshold distance; a present context corresponding to present values of the context characteristics being less than a threshold likeliness of being a previously-determined context; or a present RF profile, corresponding to the one or more present values of the RF characteristics, differing by more than a first threshold amount from the reference RF profile and less than a second threshold amount from a previously-determined present RF profile that also differed from the reference RF profile by more than the first threshold amount; or a combination of two or more of these. The context characteristics include one or more of a time of day, a day of the week, a location, a user activity, or presence of a user. The further includes means for sending, using a short-range wireless communication technique, the one or more values of the one or more RF characteristics, one or more values of one or more RF characteristics of the reference RF profile, or a combination of these, directly to a wireless communication device. The means for receiving the indications of the measurement comprise means for taking the measurements with at least one radio-frequency (RF) receiver.

Another example of a non-transitory, processor-readable storage medium includes instructions configured to cause a processor to: receive indications of measurements of one or more values of one or more radio-frequency (RF) characteristics of one or more wireless RF signals from one or more RF devices in an environment; determine contexts from values of one or more context characteristics associated with the measurements; and generate a reference RF profile by combining sets of the one or more values of the one or more RF characteristics associated with similar contexts.

Implementations of such a storage medium may include one or more of the following features. The storage medium further includes instructions configured to cause the processor to maintain the reference RF profile by updating the reference RF profile using one or more new values of the one or more RF characteristics. The instructions configured to cause the processor to update the reference RF profile are configured to cause the processor to update the reference RF profile in response to: the one or more of the new values of the one or more RF characteristics differing from the reference RF profile by more than a threshold for more than a specified time; at least one of the RF devices moving more than a respective threshold distance; a new context corresponding to new values of the context characteristics being less than a threshold likeliness of being a previously-determined context; or a new RF profile, corresponding to the one or more new values of the RF characteristics, differing by more than a first threshold amount from the reference RF profile and less than a second threshold amount from a previously-determined present RF profile that also differed from the reference RF profile by more than the first threshold amount; or a combination of two or more of these. The context characteristics include one or more of a time of day, a day of the week, a location, a user activity, or presence of a user. The storage medium further includes instructions configured to cause the processor to send, via a transmitter using a short-range wireless communication technique, the one or more values of the one or more RF characteristics, one or more values of one or more RF characteristics of the reference RF profile, or a combination of these, directly to a wireless communication device. The instructions configured to cause the processor to receive the indications of the measurements are configured to cause the processor to receive the indications of the measurements via at least one RF receiver.

BRIEF DESCRIPTION OF THE DRAWINGS

FIGS. 4-5 are examples of tables of device attributes corresponding one or more wireless communication devices.

DETAILED DESCRIPTION

Figure 1:
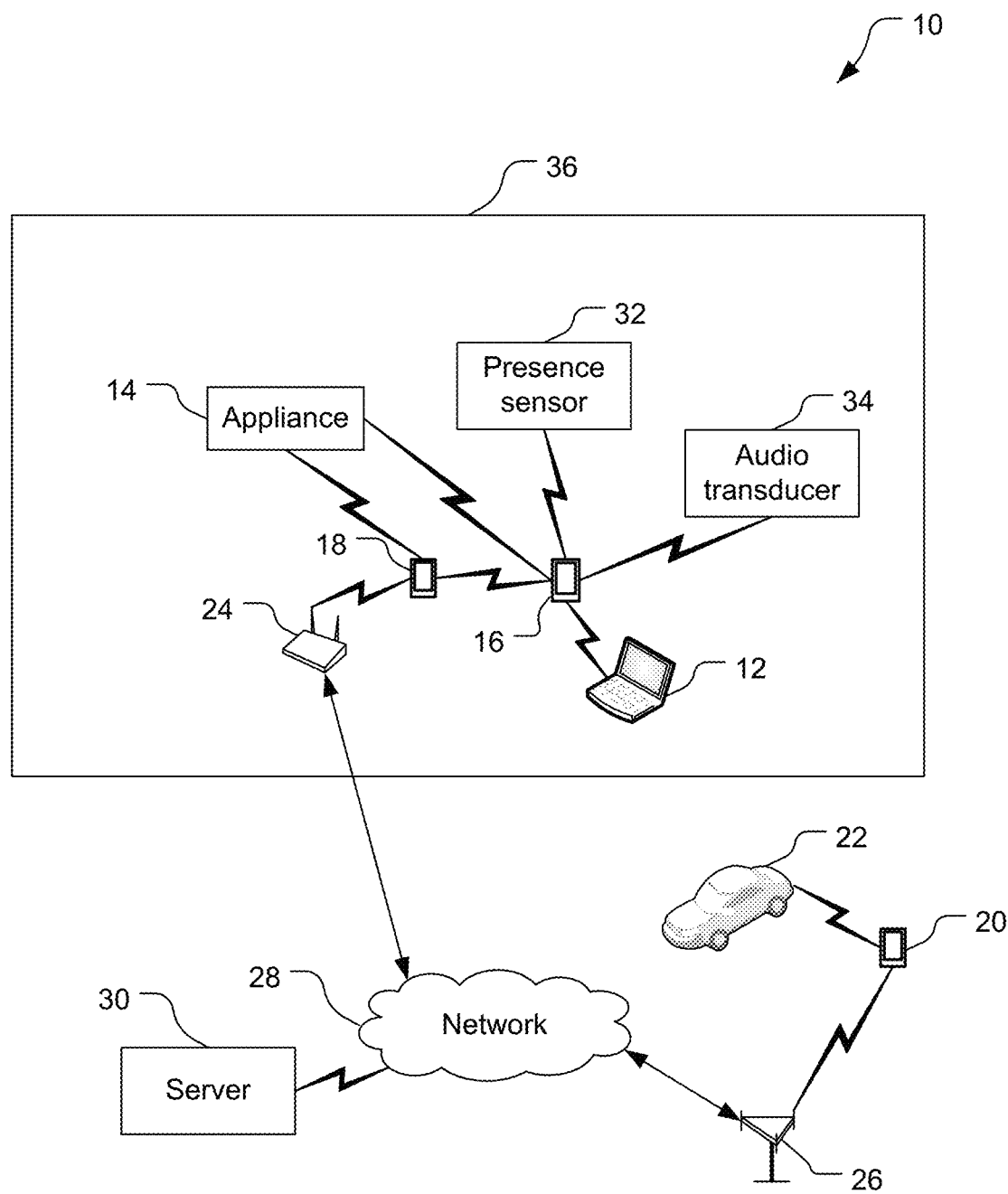
FIG. 1 is a simplified view of a wireless communication system.

Techniques are also discussed herein for communicating device attributes between devices in wireless communication networks. For example, a device may broadcast attributes of itself such as the type of device that it is (e.g., a mobile phone, a television, a refrigerator, etc.), the name of the device, whether the device is static (at least expectedly) or mobile (at least expectedly), the position of the device, etc. The device may provide one or more privacy indications associated with one or more respective attributes. A privacy indication may indicate, for example, whether a device receiving the broadcast of the attributes is permitted to forward or otherwise send or retransmit an indication of the attribute. As another example, a privacy indication may indicate whether a device is discoverable, e.g., whether a location of the device is allowed to be reported, or whether one or more other devices are authorized to determine the location of the device. For example, a device may not include a location of the device in a network table of device, locations, and attributes. Further, a first device may require authorization of a second device before the first device will provide a location of the first device. The authorization may be obtained by an exchange of security questions. Alternatively, the first device may provide the location of the first device in an encrypted message that the second device can only properly decrypt if the second device has an appropriate (authorized) cryptographic key. Alternatively still, if the authorization is unknown/unidentifiable, then the first device may use spoofing to obstruct knowledge of the location of the first device. The spoofing may be to add error to the first device's location, e.g., by adding error to a timing signal transmitted by the first device, by adjusting a power level of a transmitted signal to alter a proximity determination, and/or by reporting an inaccurate location (e.g., a truthful location plus an error, e.g., of 100 m). As still another example, what attributes of a device are included in a set of attributes and/or what attributes (or attribute values) are transmitted by the device may vary, e.g., based on location of the device, or day of week, or time of day, or combinations of these and/or one or more other criteria. These examples, however, are not exhaustive.

Techniques are also discussed herein for determining and using environmental characteristics. For example, wireless radio-frequency signals and/or other forms of information (e.g., sound, device status indications, light, temperature, etc.) may be used to determine an environmental profile indicative of an environment including a wireless communication device. The environmental profile may provide an RF signature for the environment. Different environmental profiles may be determined for different contexts such as one or more of time of day, day of week, user(s) present, activity of user(s) present, etc. Reference profiles may be stored for comparison with future profiles to determine whether a present environmental state corresponds to the stored environmental state. If the stored and present environmental states significantly differ, e.g., for the same or similar context, then one or more appropriate actions may be taken. Further, the reference profiles may be re-learned, e.g., in response to passage of time and/or in response to occurrence of one or more events, such as a profile with the same context becoming static for longer than a threshold time and/or a measured profile not matching any stored profile. Further, devices may communicate with each other, e.g., directly, to share information for producing reference profiles, confirming changes in environment, etc.

Items and/or techniques described herein may provide one or more of the following capabilities, as well as other capabilities not mentioned. Changes in environments may be determined and appropriate actions taken. Multiple different environments for the same location may be determined and used to determine whether present conditions are within expectations for the appropriate environment. Expected environments may be manually set. Other capabilities may be provided and not every implementation according to the disclosure must provide any, let alone all, of the capabilities discussed.

Referring to FIG. 1, a wireless communication system 10 includes wireless communication devices 12, 14, 16, 18, 20, 22, an access point 24, a base station 26, a network 28, a server 30, a presence sensor 32, and an audio transducer 34. The devices 12, 14, 16, 18, the access point 24, the presence sensor 32, and the audio transducer 34 are disposed inside a structure 36 (e.g., a building). The system 10 is a communication system in that components of the system 10 can communicate with one another directly or indirectly, e.g., via the network 28 and/or the access point 24 and/or the base station 26 (or other access points and/or other bases stations not shown). The system 10 is a wireless communication system in that at least some of the components of the system 10 can communicate with one another wirelessly. For example, the base station 26 and the device 20 may communicate wirelessly using signals according to one or more protocols such as LTE, GSM, CDMA, or OFDM. The single access point 24 and the single base station 26 are examples only, and other quantities of access points and/or base stations may be used. Also, the types of the devices 12, 14, 16, 18, 20, 22 (e.g., an appliance, a smart phone, a tablet computer, a laptop computer, and a car) are examples and other types of devices may be used, whether currently existing or developed in the future. The term "base station" does not limit the base station 26 to any particular form, protocol, etc. For example, any of the base station 26 (and/or other base stations not shown) may be referred to as a base transceiver station (BTS), an access node (AN), a Node B, an evolved Node B (eNB), etc. Further, the device 22 is a car and while the primary function of a car is not as a communication device, the car will comprise a communication device as a part of the car, and for simplicity of the disclosure the car is considered as one type of communication device herein.

The system 10 comprises an Internet of Things (IoT) network in this example, with the devices 12, 14, 16, 18, 20, 22 configured to communicate with each other, particularly through one or more short-range wireless communication techniques. The system 10 being an IoT network is, however, an example and not required. Examples of short-range wireless communication techniques include BLUETOOTH communications, BLUETOOTH Low-Energy communications, and Wi-Fi communications. The devices 12, 14, 16, 18, 20, 22 may broadcast information, and/or may relay information from one of the devices 12, 14, 16, 18, 20, 22 to another or to another device such as the access point 24 and/or the base station 26. One or more of the devices 12, 14, 16, 18, 20, 22 may include multiple types of radios, e.g., a BLUETOOTH radio, a Wi-Fi radio, a cellular radio (e.g., LTE, CDMA, 3G, 4G, etc.), etc. such that information may be received using one radio and transmitted using a different radio. Further, one or more of the devices 12, 14, 16, 18, 20, 22 may be configured to determine range to another of the devices 12, 14, 16, 18, 20, 22 (e.g., using round-trip time (RTT), or observed time difference of arrival (OTDOA), or received signal strength indications (RSSI), or one or more other techniques, or a combination of one or more of any of these techniques) and/or to determine angle of arrival (AOA) of a signal from another of the devices 12, 14, 16, 18, 20, 22 and/or from one or more other devices such as the access point 24 and/or the base station 26.

Figure 2:
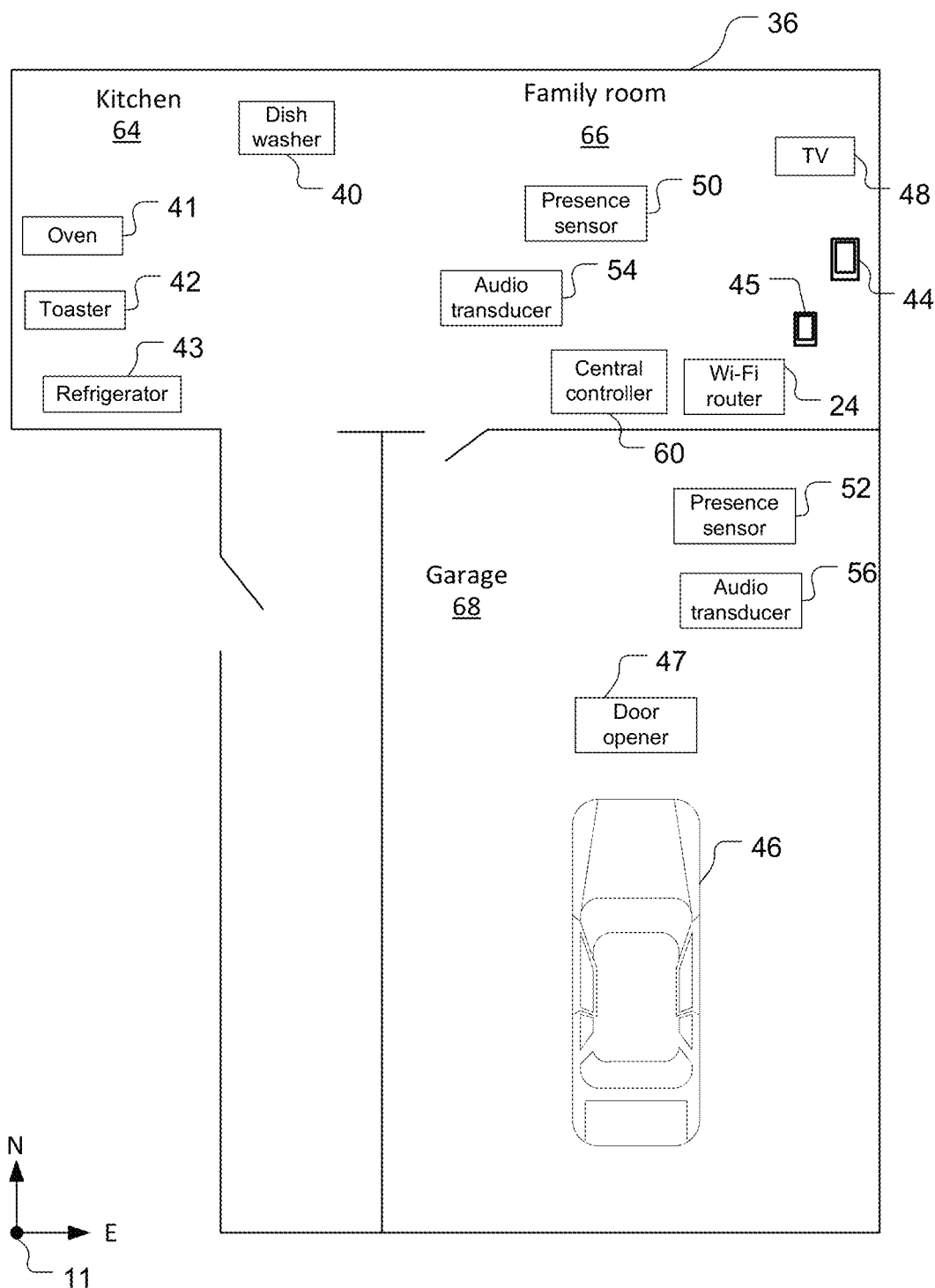
FIG. 2 is a simplified top view of an indoor portion of the wireless communication system shown in FIG. 1.

Referring to FIG. 2, and indoor portion of the system 10 inside of the structure 36 includes wireless communication devices 40, 41, 42, 43, 44, 45, 46, 47, 48 presence sensors 50, 52, audio transducers 54, 56, a central controller 60, and the access point 24 (here a Wi-Fi router). In this example, the wireless communication devices 40-48 include a dishwasher 40, an oven 41, a toaster 42, and a refrigerator 43 disposed in a kitchen 64, a tablet 44, a smart phone 45, and a television 48 disposed in a family room 66, and a car 46 and a garage door opener 47 disposed in a garage 68. These devices 40-48 are configured to communicate with each other if within communication range of each other, and to communicate with the presence sensors 50, 52 and the central controller 60. Using the communication capabilities between each other, information regarding the devices 40-48 may be sent to each other, relayed to other devices, or even relayed to the central controller 60. Further, communications from the central controller 60 may be received by, or forwarded by, the devices 40-48. Further still, the central controller 60 may be a standalone device as shown in FIG. 2 or may be incorporated into any of the devices 40-48. The system 10, in this example, provides an IoT network that can generate, send, receive, relay or forward, various information (e.g., attributes, attribute tables, information relating to attributes, signal measurements, location indications, etc.) to facilitate functionality described herein. The devices 40-48 are examples only, and other types of devices, as well as other quantities of devices, may be used.

The presence sensors 50, 52 facilitate detection of the presence of devices and/or users. The presence sensors 50, 52 may detect the presence of devices and/or persons in any of a variety of ways. For example, either or both of the presence sensors 50, 52 may comprise a movement sensor, e.g., that sends signals, measures their reflections, and compares present reflections with previous reflections. The signals may be visible or non-visible (e.g., infrared) light signals and audible or non-audible (e.g., ultrasound) sound signals. Either or both of the presence sensors 50, 52 may comprise a heat sensor, e.g., including an infrared sensor. Either or both of the presence sensors 50, 52 may be communicatively coupled (e.g., hard-wired or wirelessly in communication with) one or more of the devices 40-48 and/or the central controller 60. The presence sensors 50, 52 are configured to report the detection of presence (possibly only if new, or possibly new and ongoing) of a relevant object such as a person.

The audio transducers 54, 56 facilitate the reception and provision of commands from users to the central controller 60 or other appropriate device. The audio transducers are preferably communicatively coupled (e.g., hard-wired or in wireless communication with) the central controller 60 and are configured to receive verbal commands, convert these commands to electrical signals, and send the signals to the central controller 60 or other appropriate device. The audio transducers 54, 56 may send the signals to the central controller 60 or other appropriate device directly or indirectly (e.g., through one or more intermediate devices that relay the signals) such as one or more of the devices 40-48.

Figure 3:
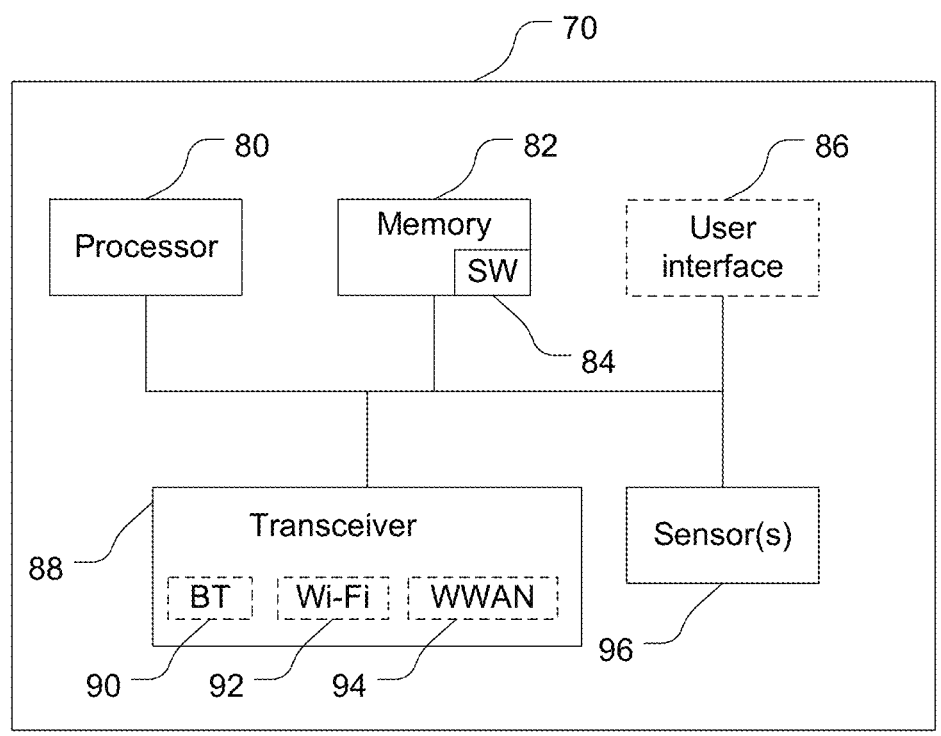
FIG. 3 is a block diagram of components of communication device shown in FIG. 2.

Referring to FIG. 3, with further reference to FIG. 1, an example wireless communication device 70 comprises a computer system including a processor 80, a memory 82 including software (SW) 84, an optional user interface 86, a transceiver 88, and one or more sensors 96. The processor 80 is preferably an intelligent hardware device, for example a central processing unit (CPU) such as those made or designed by QUALCOMM, ARM®, Intel® Corporation, or AMD®, a microcontroller, an application specific integrated circuit (ASIC), etc. The processor 80 may comprise multiple separate physical entities that can be distributed in the device 70. The memory 82 may include random access memory (RAM) and/or read-only memory (ROM). The memory 82 is a non-transitory, processor-readable storage medium that stores the software 84 which is processor-readable, processor-executable software code containing instructions that are configured to, when performed, cause the processor 80 to perform various functions described herein. The description may refer only to the processor 80 or the device 70 performing the functions, but this includes other implementations such as where the processor 80 executes software and/or firmware. The software 84 may not be directly executable by the processor 80 and instead may be configured to, for example when compiled and executed, cause the processor 80 to perform the functions. Whether needing compiling or not, the software 84 contains the instructions to cause the processor 80 to perform the functions. The processor 80 is communicatively coupled to the memory 82. The processor 80 in combination with the memory 82, the user interface 86 (as appropriate), and/or the transceiver 88 may provide at least part of means for performing functions as described herein, for example, means for generating communications with device attributes and causing the transceiver 88 to transmit these communications wirelessly from the device 70, means for receiving communications from other devices, means for transmitting communications to other devices including relaying at least portions of received communications (e.g., forwarding/sending portions of received communications), means for determining various information such as position of the device 70, relative distance from the device 70 to another device, angle of arrival of a signal at the device 70, a change in position of another device with a mobility status of "static," etc., means for determining profile characteristics, means for determining reference characteristic values, means for re-determining reference characteristic values, means for determining test characteristic values, means for comparing the reference characteristic values to the test characteristic values, means for determining differences between the reference characteristic values and the test characteristic values, means for sending requests, means for monitoring one or more RF characteristics, means for comparing one or more RF characteristics with a reference RF profile, means for initiating an action, means for determining corresponding contexts, means for providing an indication of context, means for taking a user-defined action, means for selecting a reference RF profile, means for receiving indications of measurements of values of one or more RF characteristics, means for determining contexts, means for generating a reference RF profile, means for maintaining the reference RF profile, means for sending, etc. The software 84 can be loaded onto the memory 82 by being downloaded via a network connection, uploaded from a disk, etc. The device 70 may be any of the wireless communication devices 40-48 shown in FIG. 2, or another device. The term "wireless communication device" does not require, as is apparent from the wireless communication devices 40-48, that the functionality of the device be exclusively, or evenly primarily, for communication, or that the device be a mobile device, but indicates that the device includes wireless communication capability (one-way or two-way), e.g., includes at least one radio (each radio being part of a transmitter, receiver, or transceiver (including a transmitter and a receiver)) for wireless communication. The user interface 86 (e.g., a display and/or a microphone and speaker) is optional, e.g., with the tablet 44 and the smart phone 45 including a display, a microphone, and a speaker while the garage door opener 47 does not (typically) include a display, a microphone, or a speaker, although the garage door opener 47 may include a user interface of some sort, e.g., switches operable by a user.

The transceiver 88 is configured to send communications wirelessly from the device 70 and to receive wireless communications into the device 70, e.g., from the wireless communication devices 40-48, the access point 24, or the central controller 60. Thus, the transceiver 88 includes one or more wireless communication radios (each with a corresponding antenna). In the example shown in FIG. 3, the transceiver 88 optionally includes a BLUETOOTH radio 90, a Wi-Fi radio 92, and a Wireless Wide-Area Network (WWAN) (e.g., a long-term evolution (LTE)) radio 94. As shown, each of the radios 90, 92, 94 are optional, although the transceiver 88 will include at least one wireless communication radio. Further, one or more other types of radios may be included in the device 70 in addition to, or instead of, the radio(s) 90, 92, 94. If the transceiver 88 includes more than one wireless communication radio, then the transceiver 88 may receive a wireless communication using one of the wireless communication radios, and transmit (e.g., relay or forward), the communication (or a portion thereof) using a different wireless communication radio. The communication may be transmitted to another of the wireless communication devices 40-48 or to another device such as the access point 24. Thus, for example, the device 70 may receive a wireless communication using the BLUETOOTH radio 90, and forward the communication using the Wi-Fi radio 92 to another device that does not include a BLUETOOTH radio.

The sensor(s) 96 may be configured to measure one or more other types of information. For example, the sensor(s) 96 may include a camera configured to capture images, a microphone configured to measure sound, an orientation sensor configured to measure/determine an orientation of the device 70, and/or a thermometer configured to measure temperature, etc. The processor 80 may cause the memory 82 to store indicia of sensed information, e.g., of received sound, captured images, etc.

The processor 80 is configured to relay communications between devices, for example, from the central controller 60 to the devices 40-48 or from the devices 40-48 to the central controller 60. For example, the processor 80 may receive, via the transceiver 88, the request from the central controller 60 (directly or indirectly, e.g., from another of the devices 40-48) for the location of one of the devices 40-48. The processor 80 may relay the request to one or more of the devices 40-48 within communication range of the device 70. The processor 80 is further configured to relay a reply from any of the devices 40-48 to the central controller 60, or to another device for further relay until the reply reaches the central controller 60. The reply, for example, may be a location of a target device, and the location may be a distance relative to another device, for example from the device from which the reply is received.

Attribute Determination

The processor 80 is configured to generate, store (via the memory 82), modify, and transmit (via the transceiver 88) device attribute values corresponding to the device 70. The processor 80 may determine and update the attributes, e.g., each time the processor 80 detects a possible change in an attribute (e.g., range and/or AOA to another device, position of itself, a new device within communication range, etc.). The device attributes and their respective values stored by any particular device will typically vary depending on that device. For example, referring also to FIG. 4, the processor 80 may generate and maintain an attribute table 110 including indications of attributes 112, values 114 of the attributes 112, and public/private status 116 indicative of whether the corresponding attribute 112 is public or private. In the example shown in FIG. 4, the attribute table 110 includes attributes of a device type 118, a device name/ID 120, a mobility 122, a first position 124, a first position uncertainty 126 (Pos Unc), a second position 128, a second position uncertainty 130, and a second angle of arrival 132. The second angle of arrival 132 is called the second, even though there is no first, angle of arrival in this example because the second angle of arrival 132 corresponds to the second position 128. In this example, the values 114 of the device type 118, the device name/ID 120, and the mobility 122 are "refrigerator," "frigid," and "stationary," respectively.

The processor 80 may store attribute values of other devices. The processor 80 may maintain tables of attributes for devices presently and/or formerly within communication range of the device 70. Thus, the processor 80 may store attribute values of other devices and not just relay the attribute values.

The processor 80 is configured to determine and provide positions of the device 70 relative to one or more reference locations or objects, and may provide the positions in one or more formats. For example, the processor 80 may generate a position relative to a fixed location in space. An example of this in the table 110 is the value of 114 of the first position 124 in ENU (East, North, up) coordinates. In this example, the value 114 of the first position 124 is "ENU equals [0 0 0] m" and is given in numbers of meters East, North, and up relative to a reference location. For example, the coordinates may be relative to an origin 11 (FIG. 2) that is even with a southernmost point of the structure 36, a westernmost point of the structure 36, and a lowest point of the structure 36 (e.g., of the entire structure 36 or a portion thereof such as a floor of the structure 36). The origin 11, as shown in FIG. 2, may be displaced from the structure 36 or from a particular floor of the structure 36. The value 114 of the first position uncertainty 126 is an indication of the uncertainty in each of the coordinates provided in the first position 124, and this example, being 0 m for each of the coordinates. As an example of another form of relative position, the processor 80 may be able to determine a distance relative to a reference location or object and an angle to that object (e.g., based on an angle of arrival of signals from that object). For example, in the table 110, the value 114 of the second position 128 is 2.3 m relative to a reference object. Further, the second position uncertainty 130 in this example is equal to 0.1 m, and the second angle of arrival 132 is equal to 43°.

The angle of arrival (AOA) may be provided relative to a reference direction, for example relative to true north or to magnetic north.

The processor 80 may be configured to determine the angle of arrival 132 relative to an orientation of the device 70. The processor 80 may determine the angle of arrival using any of a variety of techniques such as by analyzing received signals at one or more directional antennas of the radios 90, 92, 94 and analyzing information from one or more orientation sensors included in the device 70 such as one or more magnetometers and/or one or more accelerometers and/or a compass (such as a digital compass). The processor 80 may be configured to analyze multiple AOA determinations, e.g., determined from signals received by more than one of the radios 90, 92, 94, and to combine the determined angles, e.g., by averaging the determined angles.

The processor 80 may be configured to determine the distance to an object using known techniques (e.g., ranging using RSSI, RTT, etc.). The processor 80 may average/sample measurements over time and/or may determine ranges using multiple different techniques and/or measurements from multiple radios to improve accuracy of position determination and to detect changes in location (at least relative to one or more neighbor devices). If the processor 80 is configured to use multiple radios to determine range, then the processor 80 may be configured to select which radio(s) to use based on an estimated distance to the object and/or an environment of the device 70. As examples, if a last known location of the object was more than 150 m, then the processor 80 may select to use the WWAN radio 94, and if the object was last known to be less than 20 m away, then to use the BLUETOOTH radio 90 and the Wi-Fi radio 92. The processor 80 may update the position of the device 70 based on new measurements. Preferably, to determine the position of the device 70, the processor uses measurements from three or more stationary devices whose stationary nature and positions are exchanged/broadcast. The processor 80 may be configured to weight measurements more from devices whose mobility status is static. The processor 80 may use devices with programmed locations and/or with self-positioning capability (e.g., SPS, Wi-Fi positioning) as anchor reference objects. Based on determined relative positions to devices, and attribute values received (directly or indirectly) for these devices, the processor 80 may determine status of the devices, e.g., stationary, moved by 10 m, re-located and now stationary, etc.

The processor 80 may be configured to self-monitor the position of the device 70. The processor 80 may be configured to determine a change in the position of the device 70 based on a neighboring device list, ranges to neighbors, and/or an estimated position. A neighbor device is within range such that the neighbor device can receive a signal from the device 70 and/or the device 70 can receive a signal from the neighbor device. Measurements from devices with a mobility status of mobile may be given higher weight than normal under certain circumstances, for example, if the device has not moved in longer than a threshold amount of time.

The processor 80 may be configured to provide peer monitoring to detect changes in the location of one or more neighbor devices. For example, the processor 80 may detect and report a change in position of a particular neighboring device if the positions of a majority of the neighboring devices are constant while the relative position of the particular neighboring device changes. The processor 80 may report a change in position of a particular device if the existence of the particular neighboring device on the neighbor list changes, e.g., from being on the list to not being on the list, or from not being on the list to being on the list, while the ranges to other devices on the neighbor list remain the same.

The processor 80 is further configured to provide the public/private indications 116 indicating whether the corresponding attribute is public or private. The processor 80 is configured, in this example, to provide a value of 0 for any attribute that is to be public and a value of 1 for any attribute that is to be private. The use of 0 as an indication of an attribute being public and 1 as an indication of an attribute being private is an example only, and numerous other explicit indications of public/private status may be used. An indication that an attribute is public indicates to a device receiving the attribute table 110 that the receiving device may re-send the corresponding attribute an attribute value to a further receiving device. An indication that an attribute is private indicates to a device receiving the attribute table 110 that the receiving device may not re-send the corresponding attribute and attribute value to a further receiving device. The processor 80 is configured to receive attribute tables and to process the corresponding attributes in accordance with this public/private convention.

Alternatively, the processor 80 may generate an attribute table without the public/private indications 116. The processor 80 may generate the attribute table without explicit indications of public/private status but may still generate the attribute table with an implicit indication of public/private status for one or more of the attributes. For example, the processor 80 may generate and store the attribute table with public attributes in locations of the attribute table that are implicitly public and store private attributes in the attribute table in locations of the attribute table that are implicitly private. This technique, however, is an example only and numerous other techniques for implicit indications of public/private status may be used.

The processor 80 may be configured to process the attribute table 110 or at least one or more components thereof differently depending on the public/private status 116 of one or more of the attributes 112. For example, the processor 80 may be configured to broadcast the attribute table 110 to any device within communication range only if the public/private status 116 of all of the attributes 112 is public. In this way, non-sensitive attributes such as device type and mobility status may be broadcast to any device within communication range. For example, if the device 70 is in a geographically excluded area such as a home without a significant security risk and has a relatively short device broadcast range (e.g., short range BLUETOOTH), then the device 70 may broadcast all the attributes 112 which may provide for faster and easier set up of the device 70 than if the attribute table 110 is not broadcast. As another example, the processor 80 may be configured to broadcast only those attributes 112 whose corresponding public/private status 116 is public and to transmit the attributes 112 whose public/private status 116 is private only to devices that are credentialed and paired with the device 70. In this case, the processor 80 may be configured to transmit the entire attribute table 110 to the devices that are credentialed and paired with the device 70. In this way, sensitive attributes such as position can be protected and shared only with devices that are credentialed and paired with the device 70. For example, devices in a home network may share their respective attributes while a foreign device (e.g., and intruder's mobile phone) will not be able to access the private attributes of the devices in the home network, including the locations of the devices in the home network.

The processor 80 is further configured to process attributes received from other devices in the respective attribute tables according to the public/private status of the attributes in those tables. For example, the processor 80 preferably will not broadcast or otherwise retransmit the received values of attributes whose public/private status is private, but can rebroadcast or otherwise retransmit attributes whose public/private status is public. In this way, attributes may be relayed between devices, e.g., the devices 40-48, and provided to the central controller 60. The relaying/retransmitting of the attributes may be through the same radio and/or different radios (e.g., received via one type of radio and retransmitted using one or more other types of radios instead of or in addition to the radio through which the attributes were received). Further, the processor 80 may use information received from a transmitting device for determining the position of the device 70 but not provide information from which the position of the transmitting device may be determined if an appropriate attribute (e.g., a "device discovery permitted" attribute) transmitted by the transmitting device is indicated as being private.

The processor 80 may relay entire attribute tables received from other devices. For example, if the processor 80 receives an attribute table from a "new" device, e.g., from a device with which the processor 80 has never communicated, or at least from which the processor 80 has never received an attribute table (or possibly attributes even if not part of a table), then the processor 80 may relay (e.g., retransmit using the transceiver 88) the received attribute table. Further, the processor 80 may relay an updated attribute table from a device, e.g., if the attribute table includes a version number that indicates that the attribute table is newer than a most-recent attribute table for that device that the processor 80 has received.

Different ones of the devices 40-48 may have different priorities for relaying information such as attribute tables. For example, plugged-in devices may have higher priority than devices that are not (at least currently) plugged-in for relaying attribute tables and the devices 40-48 may communicate to reduce or eliminate redundant relaying of information. As another example, devices with more remaining battery life (e.g., current and/or estimated future life) may have higher priority for relaying information.

The device 70 may refuse an operation, such as relaying one or more attributes and/or attribute tables. The processor 80 may have a set of rules and/or criteria based upon which the processor 80 will refuse to perform one or more corresponding operations. The rules and/or criteria, and data corresponding to those rules and/or criteria may be tracked by the device 70 and/or the central controller 60. For example, the device 70 may refuse to relay an attribute table based on a battery level (existing and/or predicted) of/for the device 70. The processor 80 may be configured to send a negative acknowledgement of the operation refusal, e.g., a message indicating that the processor 80 did not or will not relay the attribute table. The processor 80 may be configured to send an indication of future operation refusal, e.g., that after a certain future time the processor 80 will not perform one or more specified functions (e.g., relaying an attribute table). The future time may be specified in any of a variety of ways such as a time of day and/or an amount of time from the present time (e.g., 10 minutes from now). The processor 80 may include an indication of a reason for the future operation refusal, e.g., that the device 70 will have an unacceptably low battery level (which could be specified, e.g., 10% or 5% of capacity).

The table 110 is an example only and more or fewer attributes may be recorded and/or transmitted by the processor 80 as part of an attribute table or independently of an attribute table. Further, other attributes than those shown in the table 110 may be included in an attribute table (e.g., in addition to or in place of one or more of the attributes shown in the table 110). For example, possible other attributes include: a list of one or more trusted devices associated with the device 70, a round-trip time associated with correspondence with another wireless communication device and a location of that device, a supported ranging protocol, a ranging uncertainty, a neighbor list indicative of access points (or other devices) neighboring the device 70, a neighbor list history, whether the device 70 may be presented on a map, and whether angle-of-arrival determinations are supported. Further, an indication may be provided as to an attribute that is not being included in an attribute table sent by the device 70 (e.g., position or altitude may be explicitly indicated as not being provided if the position or altitude has not been determined yet or the device does not have the capability to provide this information). As another example of more or fewer attributes than shown in FIG. 4 being possible, although in the table 110 there is a position uncertainty corresponding to each position, this is not required and one or more of any positions provided in any table of attributes generated by the processor 80 may have a corresponding position uncertainty or may not have a corresponding position uncertainty provided. Further, although the table 110 shows an angle of arrival associated with a position relative to an object, this is not required. The table 110 may also include an identity of an attribute for which an indication is not being transmitted by the device 70. Further, other attributes that may be included in the attribute table 110 or another attribute table, although not shown in the attribute table 110, include, for example, power consumption, power/battery status (e.g., current battery level such as remaining power amount (e.g., percent of capacity) and/or remaining time at current consumption rate, or projected battery status, or if the device is connected to wall power), activity cycle (e.g., waking schedule of when or how often a device wakes and for how long), supported wireless communication protocols (e.g., which versions of 802.11 that the device 70 supports (e.g., g, n, ac, ad)), point-of-interest location (e.g., room name, civic address, building name, store name, etc.), velocity (speed and direction), or speed. Still other attributes may be included in the table 110 such as a list of one or more trusted devices associated with the device 70, a supported ranging protocol, and a ranging uncertainty. Also or alternatively, there may be sub-attributes or tiered attributes, such as tiered locations with different levels of location specificity. For example, a point-of-interest (POI) location of the device 70 may be listed as "home" and further as "family room," or as "California," "San Diego," "Sorrento Valley," "Sorrento Valley Road," "1234 Sorrento Valley Road," and "Room 14C." Still other attributes are possible to be included in the attribute table 110 or another attribute table.

Also or alternatively, what attributes or attribute values are recorded and/or transmitted may vary based upon criteria such as time of day, day of week, day of year, location, one or more other criteria, and/or combinations of any of these. Thus, the content of the attribute table 110, or what content of the attribute table 110 is transmitted, may be dynamic. An attribute that may or may not be included in the table 110, or may or may not be transmitted by the processor 80 (via the transceiver 88) even if the attribute is included in the table 110, may be considered to be a dynamic attribute. For example, transmission of one or more attribute values may be disabled (or conversely, enabled) at certain locations, or at locations other than one or more specified locations (e.g., any location other than a user's home or other location or region), etc.

The processor 80 is configured to generate and maintain, including modifying, the attribute table 110. For example, one or more of the attributes 112 may be dynamic such that the processor 80 may update the attribute table 110. For example, the processor 80 may update the position of the device 70 intermittently (e.g., periodically), in response to a trigger such as the position of the device 70 changing more than a threshold amount, or the position of the device 70 changing at all (e.g., if the mobility value 114 of the device 70 is "stationary"). Even if the device 70 is stationary, the processor 80 may update the position of the device 70 as the position may be relative to another device that is mobile, and/or may update the table 110 to indicate the time that the position was determined (even if the position value(s) has (have) not changed). Further, many of the possible attributes determined and provided by the processor 80 may be dynamic such as power status, battery status, power consumption, velocity, speed, point-of-interest location, etc.

Further, the processor 80 may update or modify the attributes (e.g., in the attribute table 110) automatically or manually (in response to user input). As manual examples, the processor 80 may receive input from the user interface 86 and use this input to modify one or more of the attributes 112 such as the device name/ID 120 and/or the position of the device 70 (e.g., the ENU coordinates). As an automatic example, the processor 80 may be configured to determine (calculate or receive) and update the position of the device 70 (e.g., using any of a variety of techniques such as satellite positioning system (SPS), round-trip time calculation, observed time difference of arrival (OTDOA) calculation, received signal strength indication (RSSI) calculation, etc.). The processor 80 may be configured to receive a mapping of POI names and associated geographic regions, e.g., a mapping of the structure 36 shown in FIG. 2 with corresponding POI names for different regions (e.g., kitchen, family room, and garage as shown in FIG. 2). The processor 80 may determine which of the geographic locations (e.g., regions, coordinates, etc.) in the map corresponds to the location of the device 70. The processor 80 may be configured to determine the POI name based on the determined geographic location (e.g., using a look-up table of regions and POI names, or a look-up table of coordinate ranges and POI names). The processor 80 may be configured to store (e.g., initially write, or update) the POI name associated with the geographic location that corresponds to the location of the device 70, e.g., in the table 110 in the memory 82, as an indication of the location of the device 70.

The processor 80 may also, or alternatively, be configured to update the attributes (e.g., in the attribute table 110) automatically in response to receiving one or more attribute values from one or more devices within communication range of the device 70. For example, the processor 80 may receive, via the transceiver 88, one or more indications of POI location names of one or more devices within communication range of the device 70. The processor 80 may respond to receiving such indication(s) by modifying the value 114 of a POI name attribute in the table 110 to one of the received names, e.g., based on the number of devices with the same POI name, or based on the proximity of the other device(s) to the device 70, or based on mobility status of the other device(s), or one or more other criteria, or on a combination of two or more thereof. For example, the processor may change the value of the POI name attribute in the table 110 (e.g., to "family room") in response to a threshold number of received POI names from neighbor devices being "family room." As another example, the processor 80 may change the POI name in the table 110 in response to multiple devices having the same POI name and having locations relative to the device 70 within a threshold distance. As another example, the processor 80 may change the POI name in the table 110 to the POI name of a device that is within a threshold distance of the device 70. As another example, the processor may change the POI name in the table 110 to the POI name of a static device that is within a threshold distance of the device 70.

The processor 80 may also, or alternatively, be configured to transmit an alert indication in response to one or more criteria being met. For example, the processor 80 may be configured to receive an indication from another device, such as one of the devices 40-48, that the other device has a mobility status of static. The processor 80 may be configured to determine the location of the other device relative to the device 70 changes and transmit an indication that the location of the other device relative to the device 70 has changed (and possibly also that the mobility status is static). For example, the processor 80 may transmit, via the transceiver 88, an indication to the central controller 60 (directly or indirectly) that the other device, while supposed to be static, has moved. This indication, for example, maybe an alert that the other device is being stolen or otherwise improperly moved (e.g., a child moving an object that should not be moved).

As another example of location format for a location attribute, referring also to FIG. 5, the processor 80 may generate and maintain an attribute table 150 including indications of attributes 152, values 154 of the attributes 152, and public/private status 156 indicative of whether the corresponding attribute 152 is public or private. In the example shown in FIG. 5, the attribute table 150 includes attributes 152 of a device type 158, a device name/ID 160, a mobility 162, a first position 164, and a first position uncertainty 166. In this example, the values 154 of the device type 158, the device name/ID 160, and the mobility 162 are "Mobile phone," "Eldest child's phone," and "mobile," respectively. Further, the first position 164 has a value 154 that is provided in terms of latitude, longitude, and altitude (LAA). In this example, the value 154 of the first position 164 is 37.8° latitude, −122.4° longitude, and 80 m in altitude (e.g., relative to sea level). Further in this example, the public/private status 156 of the first position 164 and the first position uncertainty 166 is private. That is, the processor 80 has generated the attribute table 150 to indicate that the values 154 of the first position 164 and the first position uncertainty 166 are not to be retransmitted (e.g., rebroadcast) by any device receiving the attribute table 150.

Profile Determination

The processor 80 may be configured to obtain environmental profiles comprising collections of values of characteristics of an environment containing multiple wireless communication devices. The values of the characteristics may include, for example, values of RF (radio frequency) signals, indicia of devices transmitting the RF signals, or values measured by the sensor(s) 96. The processor 80 may obtain the environmental profiles by measuring, determining, and/or receiving (e.g., from another device that measures or determines) the values of the characteristics. Profile values may be thought of as attributes, and like attributes, can be shared, stored, and used for various purposes such as determining changes in environments and/or triggering actions. To determine/measure the environmental profiles, the processor 80 may be configured to initiate an environment profile determination mode intermittently (e.g., periodically at regular intervals, at irregular intervals, at variable intervals, in response to a trigger, etc.). The environment profile determination mode may include a sniffer mode in which the processor 80 passively scans and measures signals from neighboring devices. The environment profile determination mode may also or alternatively include an active discovery mode in which the processor 80 sends inquiries to one or more neighboring devices, e.g., by sending a ping (that may be unicast, multicast, or broadcast). The processor 80 may analyze measurements of signals received by the device 70 (e.g., passively or in response to an inquiry by the processor 80) to determine profile values such as RTT, RSSI, device ID, channel estimate (estimate of channel impulse response), etc. The environment profile determination mode may be triggered by an external entity such as a neighboring device or the central controller 60 sending a signal to the device 70, e.g., that indicates to initiate the environment profile determination mode. The amount of time spent sniffing (listening) for signals and/or the time(s) between sniffing may vary, and may depend upon a user state. For example, the processor 80 may sniff more often (i.e., time gaps, be they consistent or variable, between sniffing may be shorter) if a user is in a relatively-higher activity state (e.g., a high activity state) than if the user is in a relatively-lower activity state (e.g., an inactivity state or a sleep state). As another example, the frequency of sniffing may decrease in response to the measured profile being relatively static, i.e., not changing or changing little of a threshold amount of time. In this case, the processor 80 may enter a sleep mode, where no sniffing is performed, until an event occurs (e.g., passage of an amount of time). How often the processor 80 actively seeks to discover channel profile values may also vary, e.g., based upon the user state.

The processor 80 may be configured to produce and/or maintain (e.g., modify/update) one or more environment profile tables with determined/measured environment profile information. For example, referring also to FIG. 6, the processor 80 may be configured to produce and maintain an environment profile table 600 with profiles 610. Each of the profiles 610 includes subsets 612 of values of profile characteristics 614. In this example, the subset 612$_1$ is for a television, the subset 612$_2$ is for a family room smoke detector, the subset 612$_3$ is for a phone associated with User1, and the subset 612$_4$ is for keys associated with User1. To fill the environment profile table 600, the processor 80 may be configured to determine/measure values of the profile characteristics 614 in the environment profile determination mode. For example, the characteristics 614 may include a measuring device ID 620, a measured device ID 621, an RTT 622, an RSSI 623, RF (Radio Frequency) channel characteristics 624, a latency 625, a time of day 626, a day 627, an activity 628, and a context ID 629. The latency 625 corresponds to the transmitting device, i.e., the device from which the one or more signals were received by the processor 80. The processor 80 may analyze one or more signals received from a device to determine one or more values of the characteristics 614. The measuring device ID 620 identifies the device that obtains, e.g., measures, one or more signals from which the profile information is determined whereas the measured device ID 621 identifies the device from which one or more signals were received to determine the associated profile information. As shown, the values of the measuring device ID 620 and the measured device ID 621 are labels but other values may be used, for example, a MAC (Media Access Control) address for the respective device (that may or may not be mapped to a label). The processor 80 may be configured to assign a value of the measuring device ID 620 to each subset 612 of the profiles 610 as shown, or may be configured to assign a value of the measuring device ID 620 to the profile 610 as a whole (i.e., one measuring device ID 620 for the entire profile 610). The measuring device ID 620 may be omitted, but may be useful when considering profiles determined/measured by different devices, e.g., storing the profiles or comparing the profiles (as discussed further below). The RF channel characteristics may include, for example, delay spread, peak power to average power ratio, etc. Here, the delay spread (a measure of multipath richness of a communications channel) is the difference in nanoseconds between a first arrival time of a signal from a device and a last arrival time of that signal. The environment profile table 600 may be produced and/or maintained by the device 70 and/or the central controller 60.

The processor 80 may be configured to determine and fill the channel profile table 600 with a time of day 626, a day 627, and an activity 628, all corresponding to a timing of signals used to determine values of the entries 621-625. For example, the processor 80 may assign a value to the time of day 626 and the day 627 based upon when the environment profile determination mode is initiated that results in determining/measuring values of other ones of the characteristics 614 for the respective profile subsets 612. The value of the activity 628 characteristic may indicate qualities that depend upon the corresponding device. For example, for the TV, the value of the activity 628 may be ON or OFF, or there may be a more detailed activity value available (e.g., a channel being viewed). As another example, for the smoke alarm, the value of the activity 628 may be ON, OFF (e.g., inactive/inoperable), or SOUNDING (e.g., if smoke is presently detected). The value of the activity 628 may indicate an activity level, e.g., an amount of movement. For example, for the User1 phone, the value may be High, Low, None.

The processor 80 may determine the context of the profile 610 and assign a value of the context ID 629 accordingly. The context ID may indicate the context, e.g., watching TV, jogging, sleeping, etc., or, as in the example shown, indicate a code (here, a number) that is mapped to a context description. For example, a context ID value of 3 may correspond to daytime on a weekday with no activity (e.g., user away from home), and a context ID value of 4 may correspond to weekday evening, user watching television. The processor 80 might not be configured to determine the context ID 629 for each of the profiles 610, e.g., being configured to determine the context ID 629 only for clusters of profiles (discussed further below), or only for profiles (whether clustered or not) once the processor 80 has attempted to cluster the profiles 610. The processor 80 may be configured to assign a value of the context ID 629 to each subset 612 of the profiles 610 as shown, or may be configured to assign a value of the context ID 629 to the profile 610 as a whole (i.e., one context ID 629 for the entire profile 610). Further, if the processor 80 does not determine the context (e.g., is unable to determine the context), then the processor 80 may omit a value of the context ID 629 or may provide a generic value for the context ID 629.

The processor 80 may be configured to determine the context of the profiles 610 in any of a variety of ways. For example, the processor 80 may be configured to determine the context based on analysis of one or more values of the characteristics 621-628, to infer the context, and/or by querying a user for input. For example, if the processor 80 determines that variations in values of the characteristics 622-625 are low, e.g., below one or more corresponding thresholds, then the processor 80 may conclude that the context is that a user is not home, e.g., if the profiles 610 correspond to devices within the user's home. As another example, if the processor 80 determines that variations of the characteristics 622-625 are low but that the user is home (e.g., that the user's phone and/or the user's keys are present), then the processor 80 may conclude that the context is that the user is home but asleep. As yet another example, the processor 80 may be configured to send an inquiry to a user asking the user for input as to the context for a profile, e.g., the present context for a profile being determined, or the context for a particular day and time corresponding to a profile that has already been determined, or the context for a profile provided to the user in the inquiry. The inquiry may include one or more ranges for characteristics such as time of day. The processor 80 may provide the inquiry in any of a variety of ways. For example, the processor 80 may send an inquiry that manifests as a pop-up window on a display of a user's device (e.g. a smartphone) asking for the context for a bedroom, in which a particular alarm clock is present, of the user's house from 12 AM to 6 AM. The processor 80 may then store, as the context ID 629, a response received from the user, e.g., Child1 sleeping.

The processor 80 may be configured to determine clusters of the profiles 610 having one or more common or similar characteristic values, such as similar contexts. Characteristic values may be considered to be similar if the values are within one or more ranges for the characteristic. For example, profiles 610 with time of day 626 values within an evening range (e.g., 6 PM-10 PM), or a night range (e.g., 10 PM-6 AM), or a morning range (e.g., 6 AM-12 PM), or an afternoon range (e.g., 12 PM-6 PM) may be clustered with other profiles having time of day 626 values with the same range. These ranges are examples only, and other quantities and/or durations of ranges may be used, for example for ranges of time where more frequent profile determinations/measurements are made. Also, what value(s) is(are) used to cluster the profiles 610 is not limited, and can be any of the available characteristics or a combination of characteristics. Also or alternatively, the processor 80 may cluster profiles 610 that have multiple characteristics with common or similar values. For example, the processor 80 may cluster the profiles 610 that have similar values of the time of day 626 and similar values of, or the same value of, the day 627, and possibly the same or similar activity level 628. Also or alternatively, the processor 80 may cluster the profiles 610 based on status of one or more devices (e.g., whether a device is on or off). Also or alternatively, the processor 80 may cluster the profiles 610 based on one or more users, e.g., clustering the profiles 610 associated with the same user or with similar users. For example, the processor 80 may cluster the profiles 610 based on a user included in the profiles 610 (e.g., User1 implicitly identified in the profiles $610_1$ and $610_2$ due to the device ID 621 values in each of these profiles 610). As another example, the processor 80 may cluster the profiles 610 based on target users, e.g., users of the devices from which values of the profile characteristics 614 were determined/measured, or users identified by movement/activity pattern of the user (e.g., of the user's device(s)). As examples, there may be different clusters for night, morning, afternoon, evening, in home, outside home, context (e.g., studying, playing, watching TV, on vacation, etc.), etc., or a combination of two or more of these (including using one or more criteria not listed). In these examples, the profile $610_3$ is not clustered with another profile, but the profile $610_3$ may be clustered with the profile $610_1$ and/or the profile $610_2$ and/or one or more other profiles 610 in other examples.

Figure 7:
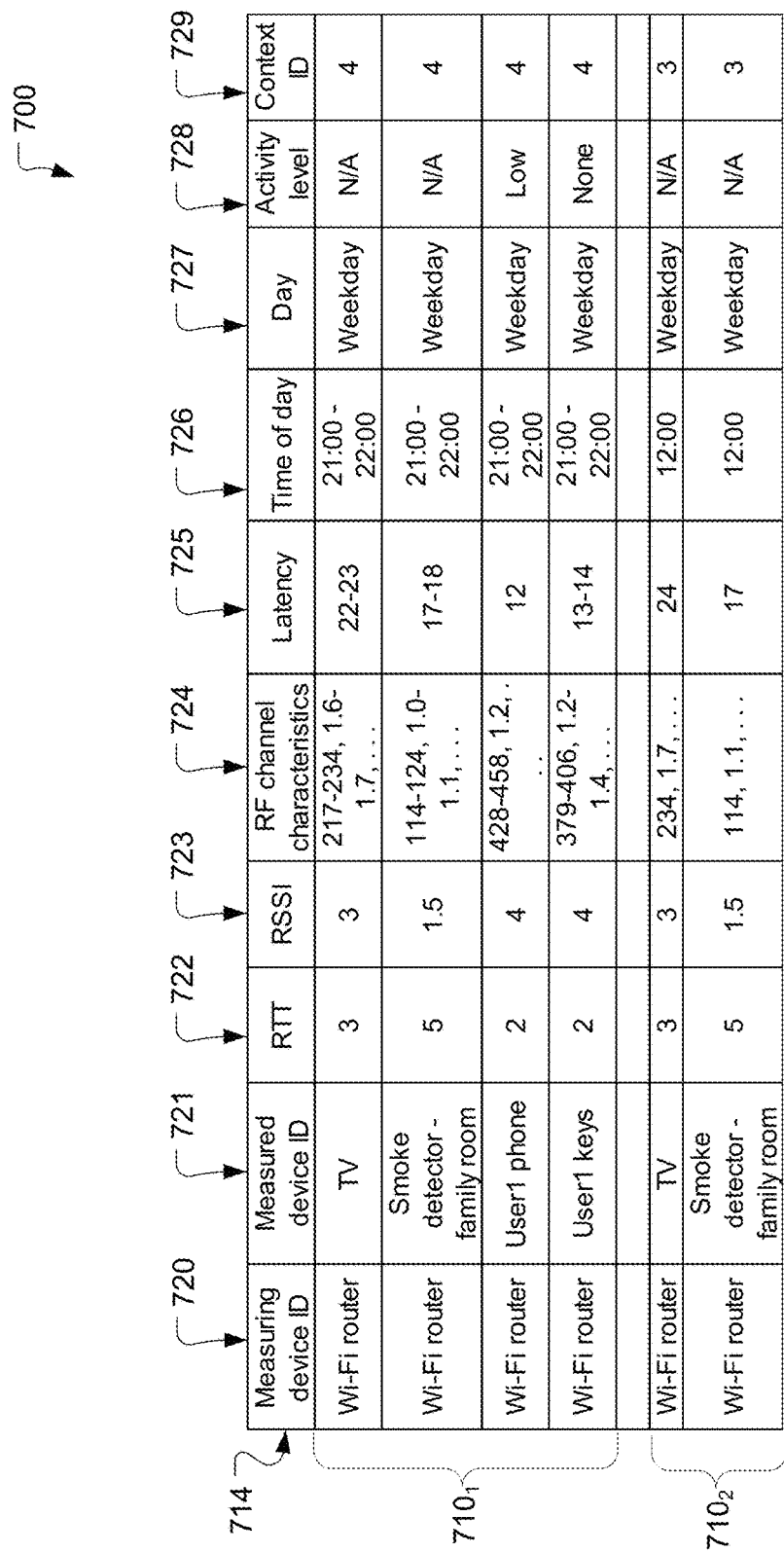

Referring also to FIG. 7, the processor 80 may produce and maintain a clustered profile table 700. In this example, the clustered profile table 700 includes a clustered profile $710_1$ and a non-clustered profile $710_2$. The clustered profile $710_1$ is a combined profile determined by the processor 80 from the profiles $610_1$ and $610_2$ because the profiles $610_1$, $610_2$ have values of the time of day 626 that are similar, both being in the evening, values of the day 627 that are identical, and identical values of activity 628 of the same device, here User1's phone. Characteristics 714 in the profile table 700 include a measuring device ID 720, a measured device ID 721, an RTT 722, an RSSI 723, RF channel characteristics 724, a latency 725, a time of day 726, a day 727, an activity 728, and a context ID 729. The clustered profile $710_1$ has ranges of values of the characteristics 714 whose values were not identical in the profiles 610 that were combined. In this example, the clustered profile $710_1$ has ranges of values of delay spread for the TV, the family room smoke detector, the User1 phone, and the User1 keys, ranges of values of the peak power to average power ratio for the TV, the family room smoke detector, and the User1 keys. These are examples only, and other characteristics, e.g., the RTT and/or the RSSI, may have ranges in clustered profiles. In any given clustered profile, one or more of the characteristics 714 may have a range of values. Further, ranges of values may be named (e.g., simplified). For example, instead of the value of the time of day 726 for the profile $710_1$ being 21:00-22:00 as shown, the value of the time of day 726 could be "evening." As with the environment profile table 600, the clustered profile table 700 may be produced and/or maintained by the device 70 and/or the central controller 60.

The processor 80 may share some or all of the profile table 600 and/or some or all of the profile table 700 with one or more other devices (e.g., the devices 40-48, 50, 52, 54, 56 shown in FIG. 2), and may receive profile information from other devices. The processor 80 may store information received from one or more other devices in the profile table 600 and/or the profile table 700. The processor 80 may request profile information from other devices, may respond to requests by other devices by sending profile information to the other devices. For example, the processor 80 may send profile information to the central controller 60 and/or receive profile information from the central controller 60. Also or alternatively, the processor 80 may directly communicate with another device (e.g., the devices 40-48, 50, 52, 54, 56 shown in FIG. 2) via the transceiver 88, i.e., sending a communication to the other device, or receiving a communication from the other device, without the communication passing through an intermediate device. The processor 80 may send profile measurement data to the central controller 60 to compile the profile table 600 and/or the profile table 700. For example, the processor 80 may send the profile table 600 to the central controller 60 for determining the profile table 700 by clustering the subsets 612 of profile data.

The processor 80 may send out and/or receive profile information to/from another device to help with determination of profiles. The processor may send/receive such information directly to/from the other device. Profile information received from another device may be combined by the processor 80 with profile information determined by the processor 82 help improve the quality (e.g., accuracy) of the profiles 610, 710 determined by the processor 80. The processor 80 may use received profile information to re-determine profile information of the profiles 610, 710. For example, profile information determined by a mobile device, such as a smart phone, may be combined with profile information determined by one or more static devices. The processor 80 may use the received information to help train the determination of profile information by the processor 80 (e.g., based on information from the sensor(s) 96), particularly if the received information comes from a device with more accurate sensing than the device 70. Further, the processor 80 may use information regarding context received from another device to modify the profiles 610, 710. For example, mobile devices may have more information about context that can be shared with the processor 80, and the processor 80 may use the context information to improve the determined context for the profiles 610, 710.

Figure 8:
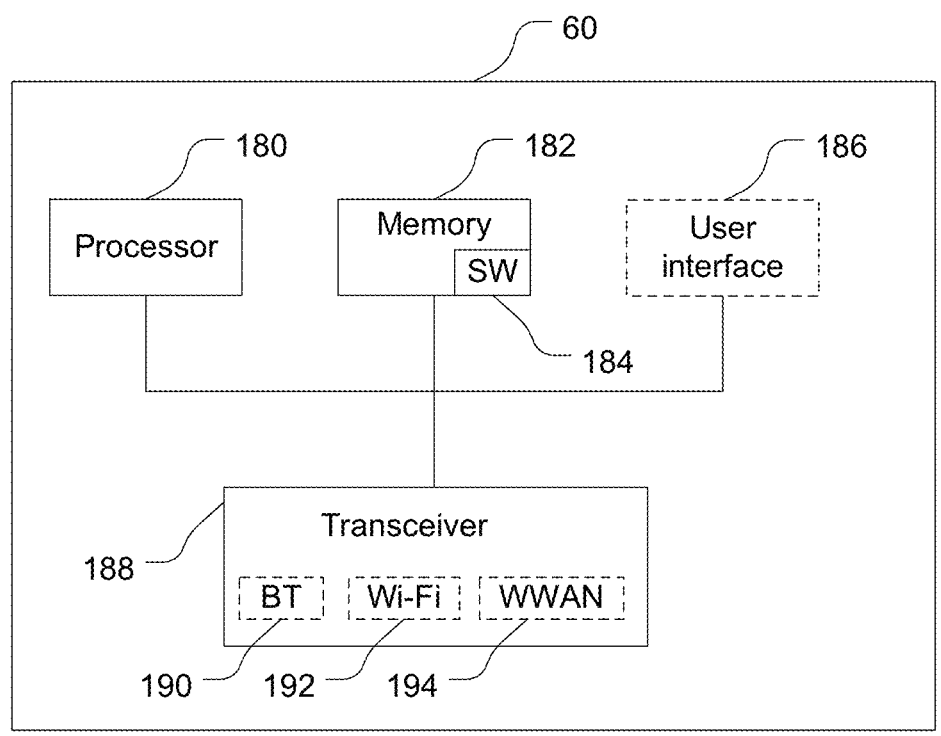
FIG. 8 is a block diagram of components of a central controller shown in FIG. 2.

Referring to FIG. 8, with further reference to FIGS. 1-2, an example of the central controller 60 comprises a computer system including a processor 180, a memory 182 including software (SW) 184, an optional user interface 186, and a transceiver 188 optionally including a BLUETOOTH (BT) radio 190, a Wi-Fi radio 192, and/or a WWAN radio 194. Other types of radios may also or alternatively be used, e.g., a BLUETOOTH-Low Energy (BT-LE) radio. The processor 180 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 180 may comprise multiple separate physical entities that can be distributed in the central controller 60. The memory 182 may include random access memory (RAM) and/or read-only memory (ROM). The memory 182 is a non-transitory, processor-readable storage medium that stores the software 184 which is processor-readable, processor-executable software code containing instructions that are configured to, when performed, cause the processor 180 to perform various functions described herein. The description may refer only to the processor 180 or the central controller 60 performing the functions, but this includes other implementations such as where the processor 180 executes software and/or firmware. The software 184 may not be directly executable by the processor 180 and instead may be configured to, for example when compiled and executed, cause the processor 180 to perform the functions. Whether needing compiling or not, the software 184 contains the instructions to cause the processor 180 to perform the functions. The processor 180 is communicatively coupled to the memory 182. The processor 180 in combination with the memory 182, the user interface 86 (as appropriate), and/or the transceiver 188 may provide at least part of means for performing functions as described herein, for example, means for determining profile characteristics, means for determining reference characteristic values, means for re-determining reference characteristic values, means for determining test characteristic values, means for comparing the reference characteristic values to the test characteristic values, means for determining differences between the reference characteristic values and the test characteristic values, means for sending requests, means for monitoring one or more RF characteristics, means for comparing one or more RF characteristics with a reference RF profile, means for initiating an action, means for determining corresponding contexts, means for providing an indication of context, means for taking a user-defined action, means for selecting a reference RF profile, means for receiving indications of measurements of values of one or more RF characteristics, means for determining contexts, means for generating a reference RF profile, means for maintaining the reference RF profile, means for sending, etc. At least some of the functions that may be performed by the central controller 60 may be performed by the server 30. The software 184 can be loaded onto the memory 182 by being downloaded via a network connection, uploaded from a disk, etc. The central controller 60 is shown in FIG. 2 as a standalone device separate from the devices 40-48, but the central controller 60 could be implemented by one or more of the devices 40-48 and/or one or more other wireless communication devices such as the access point 24. The central controller 60 is preferably, though not necessarily, a (primarily) static device.

Figure 6:
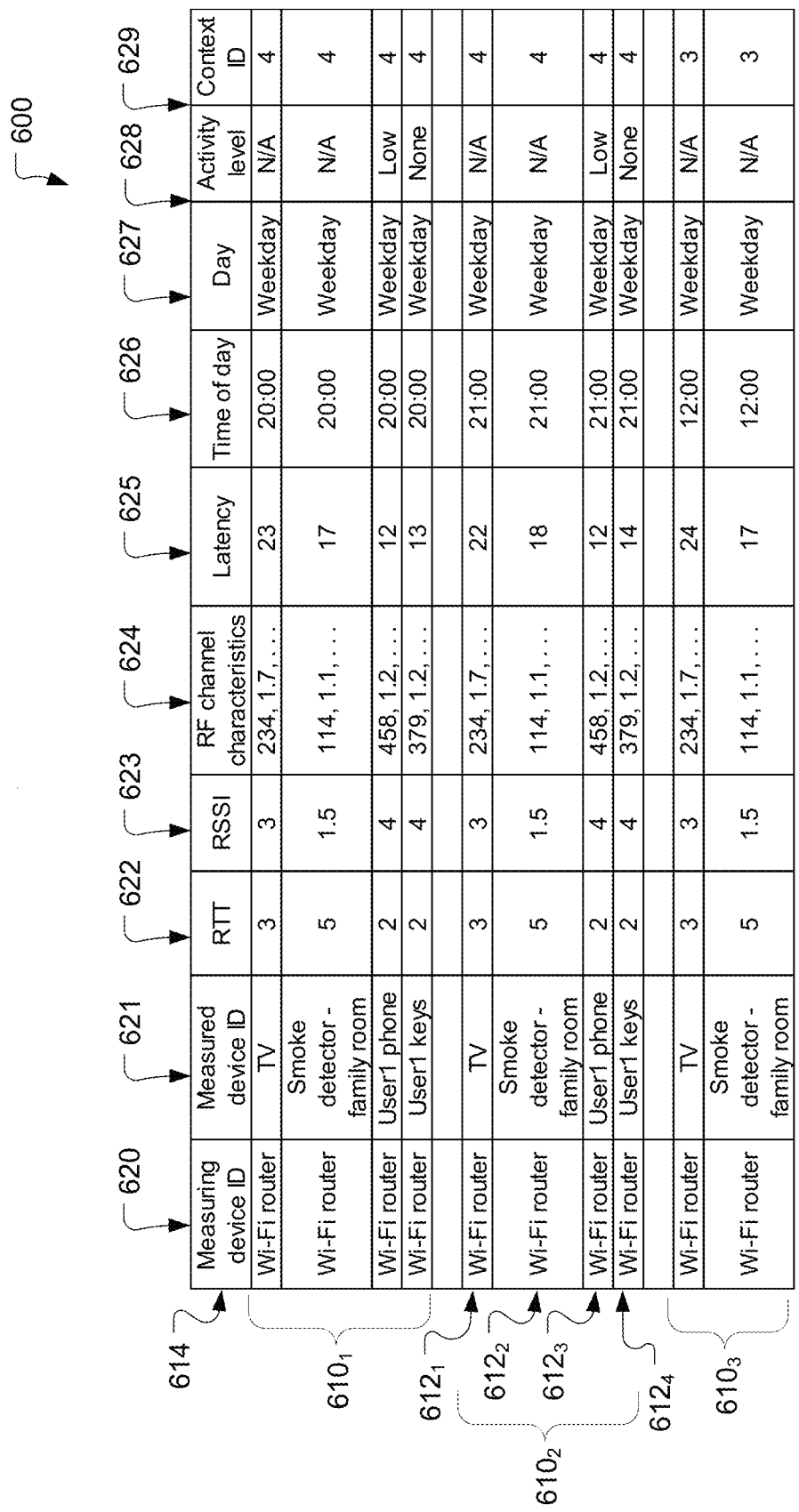
FIGS. 6-7 are example profile tables of characteristic values of an environment.

Referring also to FIGS. 3 and 6-7, the processor 180 may be configured to compile environmental profiles and store the environmental profiles in the memory 182. For example, the processor 180 may compile and store the profile table 600 and/or the profile table 700 in the memory 182. Thus, the processor 180 may perform functions discussed above with respect to the processor 80, such as determining context and clustering appropriate ones of the profiles 610, regarding arranging and combining profile information measured and determined by the device 70. The discussion above addresses the processor 80 performing the various functions, but the discussion above applies equally well to the processor 180 of the central controller 60. The discussion below focuses on the central controller 60 performing various functions, but these functions may be performed by the device 70.

Triggering Action Using Profiles

The controller 60 may be configured to compare test profile information against stored profile information and to classify the test profile. The test profile contains values of characteristics called test characteristic values. For example, the central controller 60 can compare test profile information (e.g., a new profile received from the device 70) to the profiles 710 to determine measures of similarity (or difference) to the profiles 710. The controller 60 may compare less than all of the information in a test profile to corresponding values of the profiles 710. For example, the controller 60 may compare only values of RTT, RSSI, RF channel characteristics, and/or latency of the test profile information with corresponding values of the profiles 710. The controller 60 may compare the test profile information to a subset of the profiles 710. For example, only the profiles 710 that have times of day, days, and/or measuring device IDs that match the test profile information. As another example, the controller 60 may compare the test profile information only to the profiles 710 corresponding to locations that are close to (e.g., the same room in a house) a location corresponding to the test profile information (e.g., the location of the measuring device). The controller 60 may classify the test profile as corresponding to one or more of the values of the characteristics 714 of the profile 710 that most closely matches the test profile and that were not used to compare the test profile with the profiles 710. For example, the controller 60 may classify the test profile as corresponding to the context of the profile 710 whose values of RF channel characteristics, latency, time of day, day, and activity level most closely match corresponding values of the test profile.

The controller 60 may be configured to compare test profile information against stored profile information and to take an action based on the similarity of the test profile information and reference profile information of the stored profile information. The controller 60 may be configured to compare a test profile with the profiles 710 as discussed above, to select a reference profile from the profiles 710, and/or to receive a manual indication of the reference profile. The reference profile contains values of characteristics, called reference characteristic values, for comparison with the test characteristic values. The controller 60 may be configured to compare the test profile with the reference profile, i.e., to compare the test characteristic values with the reference characteristic values. For example, the controller 60 may a select, as a reference profile, one of the profiles 710 whose context corresponds to the context of the test profile, e.g., whose value of the context ID 729 matches the corresponding value of the test profile. The controller 60 may use more than one characteristic value to select the reference profile. For example, the controller 60 may a select, as the reference profile, one of the profiles 710 whose values of the context ID 729, the time of day 726, and the day 727 match the corresponding values of the test profile. The controller 60 may be configured to determine a measure of similarity between the test profile and one or more of the stored profiles 710. The controller 60 may determine the measure of similarity of the reference profile and the test profile by comparing one or more values of the characteristics 714 of the reference profile against the corresponding characteristic(s) of the test profile. For example, the controller 60 may compare one or more values of the corresponding characteristics 714 other than those used to determine the reference profile. The controller 60 may compare the test profile and the reference profile as a whole, may compare an individual value (e.g., to determine whether a test profile value outside of a range of the reference profile), or may compare fewer than all the characteristics of the test and reference profiles. The controller 60 may be configured to take appropriate action based on the measure of similarity of the test profile and the profiles 710. For example, the controller 60 may take an action if the test profile is within a threshold similarity of one of the stored profiles 710. As an example of this, the controller 60 may turn on a light if the test profile is most similar to a profile with a context of a user watching TV in the evening, and the controller 60 determines that a room in which the user presently resides is below a threshold brightness (e.g., as measured by the sensor 96), or does not have any light turned on. Also or alternatively, the controller 60 may take an action if the test profile differs by more than a threshold difference from a similar one of the profiles 710. The controller 60 may be configured to take an action if the difference between the test profile and the reference profile exceeds a threshold. For example, the controller 60 may sound an alarm, send an alert (e.g., text, images, video, etc.) to the user, and/or send an alert to the police, etc. in response to the controller 60 determining that the test profile differs by more than a threshold amount from the reference profile where the reference profile has a context of the user being on vacation. An example of such a difference may be the presence of a device not present in the reference profile. The controller 60 may be configured to determine a difference indicative of a particular condition such as motion. The controller 60 may be configured to act differently in response to different differences in the test profile and the reference profile.

The controller 60 may be configured to take different various actions based on the measure of similarity between the test profile and the reference profile. Actions to be taken, and/or one conditions triggering the actions, may be configured by a user. Different actions may be based on the context of the reference profile and/or the nature of the difference between the test profile in the reference profile. For example, the controller 60 may be configured to turn a device on or off based on the measure of similarity and the context of the reference profile. As another example, the controller 60 may be configured to send an alert (e.g., of intruder) to a user in response to the controller 60 determining possible motion in an environment (e.g., RTT, RSSI, and/or RF channel characteristics differing from test profile to reference profile too much) when the context is indicative of no motion being expected (e.g., the user is at work, the user is on vacation, etc.). As yet another example, the controller 60 may be configured to detect unexpected user behavior such as the user leaving the user's house, with no other person in the house, while the television 48 is on.

The controller 60 may be configured to provide one or more services based on comparing the test profile and the reference profile. The controller 60 may be configured to act as an inactivity (e.g., silence) detector, e.g., by determining a lack of change in environment when change is expected. For example, the controller 60 may determine that the test profile is stagnant over time while there are one or more ranges of values in the reference profile. This may occur, for example, when an elderly person, a child, or a pet is at home and is expected to be moving but is not, e.g., if the elderly person, child, or pet is injured. The controller 60 may take an appropriate action, e.g. notifying the user or an emergency service, in response to detecting unexpected inactivity. The controller 60 may be configured to detect unexpected motion of mobile devices. For example, if the test profile indicates that a child is unexpectedly leaving a house, e.g., the child's mobile phone is going amount of Wi-Fi range or the RTT is higher than expected based on the reference profile (e.g., corresponding to a weekday evening), then the controller 60 may take an appropriate action such as sending an alert to the child's parent. The controller 60 may serve as a thief or stranger detector. For example, if a user sets the reference profile to an on-vacation profile, and the comparison of the test profile to the reference profile shows a device in the test profile that is not in the reference profile, then the controller 60 may take appropriate action such as sounding an alarm, sending an alert, turning on a security light, etc. The controller 60 may serve safety, energy-conserving, and/or convenience functions. For example, the controller 60 may be configured to turn a device on or off in response to determining that nobody is home. Thus, the controller 60 may turn air-conditioning off, turn a robot vacuum cleaner on, and/or turn a toaster off in response to determining that nobody is or has been home for a threshold amount of time.

A device other than the controller 60 may be configured to determine the reference profile, compare the reference profile with the test profile, and/or take one or more actions in response to the results of the comparison. For example, any of the devices 40-48 shown in FIG. 2 may be configured to perform one or more of these functions.

Further, multiple devices may collaborate to determine whether the difference in the test profile compared to the reference profile warrants a responsive action. A requesting device (e.g., the controller 60 or other device) may attempt to confirm, or at least increase confidence in, a determination regarding a test profile and a reference profile. For example, the requesting device may respond to making an environment-change determination that the measure of similarity between a first test profile and a first reference profile exceeds (or does not exceed) a threshold by sending a request to another device (the "requested device") to obtain measurement data or even a second test profile from the requested device. The requesting device may compare the measurement data with data measured by the requesting device to determine whether the measurement data from the two devices are consistent. The requesting device may also, or alternatively, compare the second test profile with a second reference profile that has a similar (or identical) context as the first reference profile but has the requested device as the measuring device to determine whether the second test profile differs from the second reference profile similarly to the first test profile differing from the first reference profile. As another example, the requesting device may combine the first test profile with the second test profile to form a combined test profile, and compare the combined test profile with a corresponding combined reference profile to determine whether there is a difference (or lack thereof) in the measure of similarity warranting performance of an action.

Further still, multiple devices may collaborate to notify one device of a determined measure of similarity by another device. For example, a device such as the television 48 may inform another device such as the dishwasher 40 that the television 48 determined a significant difference between the test profile and the reference profile. As another example, a device such as the television 48 may instruct one or more of the other devices, such as the dishwasher 40 and the refrigerator 43, to capture and send images to the controller 60. As yet another example, the device may instruct one or more other devices to send measurement profiles to the controller 60.

Profile Maintenance

Maintaining the profile tables 600, 700 allows the processor 180 (and/or the processor 80) to adapt to long-term environmental changes for which profile information can be determined and used for comparison as reference profile information. While maintenance of the profile tables 600, 700 may be performed by the device 70, or the controller 60, or one or more other devices, or a combination thereof, the discussion here uses the example of the controller 60 maintaining the profile tables 600, 700. The processor 180 may be configured to maintain the profile tables 600, 700 by learning new profile information and updating the tables 600, 700 by re-determining profile information that may be used as reference profiles. Learning by the processor 80 may be initiated in a variety of manners, for example, intermittent (e.g., periodic) learning triggered by passage of an amount of time, event-triggered learning triggered by the occurrence or non-occurrence of an event, in response to user instruction, etc.

For intermittent learning of profile information, the processor 180 may initiate obtaining profile information in response to passage of an amount of time since a most-recent learning. The amount of time may be specified by a user, a manufacturer of the controller 60, or by another entity. The processor 180 may initiate learning by instructing the device 70 to measure/determine present profile information and report that information to the controller 60. The controller 60 may use the reported information to update the profiles 610, 710 (e.g., by replacing profile information, averaging profile information, replacing old data points used for averaging with new data points (e.g., first in, first out (FIFO) data usage) and re-computing the average, etc.). The amount of time used as the trigger may be consistent (e.g., for periodic learning), or may vary.

For event-triggered learning, one or more of a variety of events may trigger profile learning. For example, the controller 60 may be configured to detect if a position of a device, e.g., of a typically-static device, changes by more than a threshold distance and respond to detecting this change by triggering learning of profile information. As another example, the controller 60 may be configured to trigger learning in response to determining that a profile change has become static (e.g., multiple consecutive test profiles differ from a reference profile but do not differ, or differ by less than a threshold amount, from each other for more than a static-profile threshold amount of time). Thus, an initial determination of the change may trigger an action, such as an alert, and continued determination of the same or similar change may trigger learning to update the reference profile. In this case, the processor 180 may discard profile information determined/measured before the change. As another example, the now-static profile may not have differed significantly from the reference profile, but would significantly alter the reference profile if used to form a new reference profile (e.g., using some or all of the data used to produce the present reference profile). As yet another example, the controller 60 may be configured to trigger learning in response to determining that a test profile differs from the saved profiles 610, 710 by more than a threshold amount. In this example, the controller 60 may be configured to trigger learning in response to determining that the test profile is less than a threshold likelihood of corresponding to any of the saved profiles 610, 710. For example, this could be determining that the context of the test profile has less than the threshold likelihood of corresponding to the context of any of the saved profiles 610, 710. A combination of two or more events may be used to trigger learning of the profile information.

User-instructed profile information learning may or may not be prompted by the processor 180. A user may send an instruction to the processor 180 via the user interface 186 for the processor 180 to learn present profile information. The processor 180 may prompt the user via the user interface 186 as to whether the user wants the processor 180 to initiate learning of profile information. For example, the processor 180 may respond to determining that the test profile differs from the reference profile by prompting the user for a learning instruction. The processor 180 may prompt the user for the learning instruction depending on the degree of difference between the test profile and the reference profile, e.g., prompting the user for the learning instruction in response to the two profiles differing by a learning-prompt threshold that is greater than the threshold inducing another action such as an alert.

Operation

Figure 9:
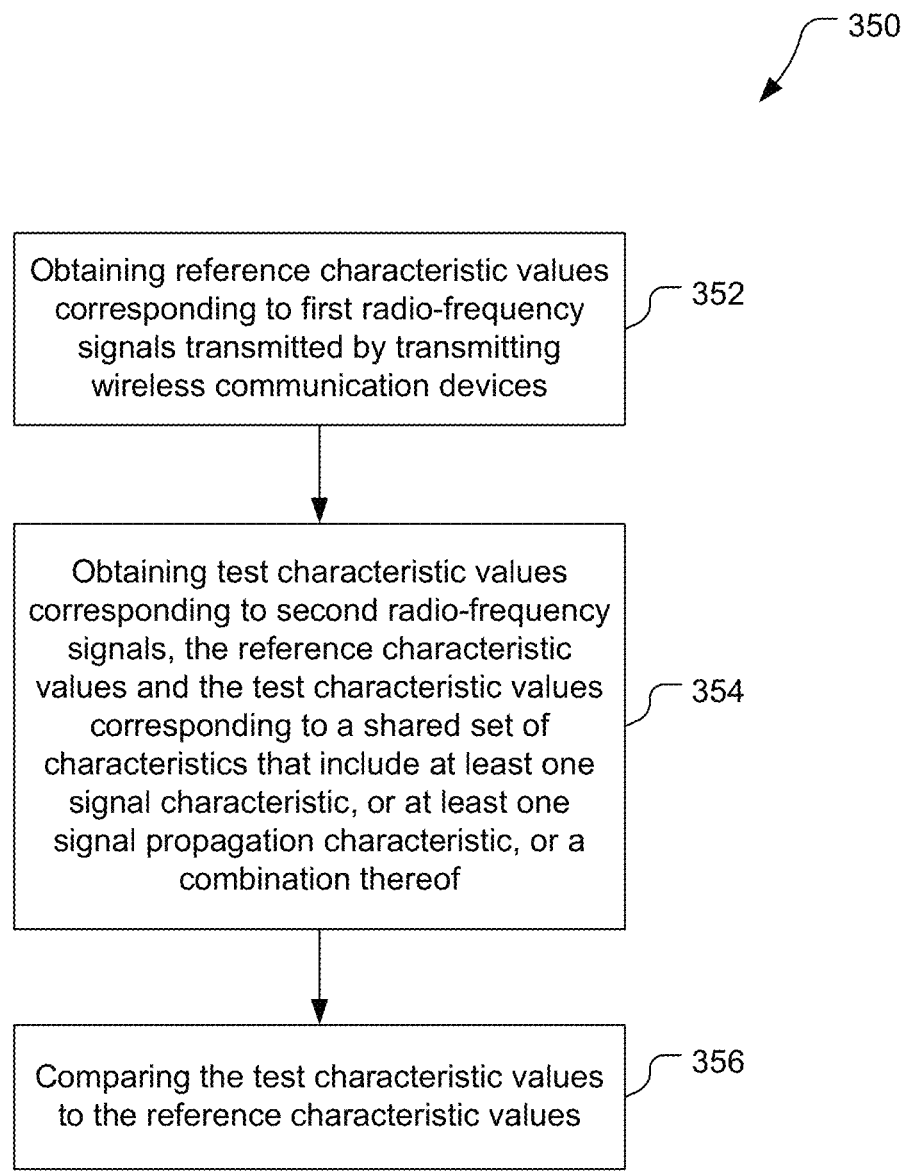
FIG. 9 is a block flow diagram of a method of analyzing characteristic values corresponding to radio-frequency signals.

Referring to FIG. 9, with further reference to FIGS. 1-8, a method 350 of analyzing characteristic values corresponding to RF signals includes the stages shown. The method 310 is, however, an example only and not limiting. The method 350 may be altered, e.g., by having stages added, removed, rearranged, combined, performed concurrently, and/or having single stages split into multiple stages.

At stage 352, the method 350 includes obtaining reference characteristic values corresponding to first radio-frequency signals transmitted by transmitting wireless communication devices. For example, stage 352 may include the processor 80 determining one or more of the reference characteristic values by analyzing RF signals received by the transceiver. Also or alternatively, stage 352 may include the processor 80 receiving one or more of the reference characteristic values from the sensor(s) 96. Also or alternatively, stage 352 may include the processor 80 receiving one or more indications of one or more of the RF signals, the processor 80 deriving one or more of the reference characteristic values from the one or more indications. Also or alternatively, stage 352 may include the processor 80 receiving one or more of the reference characteristic values (or one or more indications of one or more of the RF signals) from another wireless communication device, e.g., using a short-range wireless communication technique such as BLUETOOTH® wireless technology. Also or alternatively, stage 352 may include the processor 180 of the controller 60 measuring, determining, and/or receiving one or more of the reference characteristic values. For example, stage 352 may include the processor 180 determining one or more of the reference characteristic values from information received from another wireless communication device indicative of one or more of the RF signals. The reference characteristic values may include, for example, values of one or more of the profile characteristics 614 shown in FIG. 6, and/or one or more other characteristics (e.g., sound volume, device status (e.g., ON, OFF), etc.). Further, one or more different characteristics may be obtained from different RF signals and/or from different transmitting devices.

Also or alternatively, stage 352 may include combining sets of characteristic values, each of the sets of characteristic values corresponding to a similar context, to obtain the reference characteristic values. For example, stage 352 may include the processor 80 and/or the processor 180 clustering profiles, e.g., respective ones of the profiles 610 with the same or similar contexts, into clustered profiles.

Also or alternatively, stage 352 may include re-determining the reference characteristic values. For example, stage 352 may include the processor 80 and/or the processor 180 determining the reference characteristic values using the first radio-frequency signals, and re-determining the reference characteristic values using further radio-frequency signals. The further radio-frequency signals may be transmitted by one or more of the same wireless communication devices that transmitted the first radio-frequency signals and/or by one or more other wireless communication devices. The stage 352 may include the processor 80 and/or the processor 180 re-determining the reference characteristic values in response to one or more stimuli such as: the passage of a specified time interval; one or more transmitting wireless communication devices moving more than a respective threshold distance; a context of the first radio-frequency signals being less than a threshold likeliness of being a previously-determined context; the test characteristic values being first test characteristic values and second test characteristic values being within a threshold similarity of the first test characteristics, the second test characteristic values being based on fourth radio-frequency signals associated with a first time that is more than a static-profile threshold amount of time after a second time that is associated with the second radio-frequency signals; or a combination of two or more of these.

At stage 354, the method 350 includes obtaining test characteristic values corresponding to second radio-frequency signals, the reference characteristic values and the test characteristic values corresponding to a shared set of characteristics that include at least one signal characteristic, or at least one signal propagation characteristic, or a combination thereof. For example, stage 354 may include the processor 80 and/or the processor 180 measuring, determining, and/or receiving the test characteristics in one or more ways of the possible ways discussed with respect to stage 352 for obtaining the reference characteristic values.

At stage 356, the method 350 includes comparing the test characteristic values to the reference characteristic values. For example, stage 356 may include the processor 80 and/or the processor 180 comparing test characteristic values to corresponding ones of the reference characteristic values, e.g., from a clustered profile or an unclustered profile. The stage 356 may include the processor 80 and/or the processor 180 selecting reference characteristic values that are in a profile having a similar context as the test characteristic values and/or have one or more other characteristic with values that are determined to be similar to values of corresponding characteristics associated with the reference characteristics. For example, the processor 80 may select a reference profile with a time of day value and an activity level value that are similar to values of time of day and activity level associated with the test characteristics.

The method 350 may further include determining a first context corresponding to the first radio-frequency signals and determining a second context corresponding to the second radio-frequency signals, where comparing the test characteristic values to the reference characteristic values is performed in response to determining that the first context corresponds to the second context. For example, the method 350 may include the processor 80 and/or the processor 180 analyzing the first radio-frequency signals and the second radio-frequency signals to determine respective contexts. Also or alternatively, the method 350 may include the processor 80 and/or the processor 180 analyzing received information indicating respective contexts for the first radio-frequency signals and the second radio-frequency signals. As a further example, the method 350 may include the processor 80 and/or the processor 180 comparing the test characteristic values to the reference characteristic values only if the respective contexts match (are identical), or perhaps only if the respective contexts are sufficiently close (e.g., watching TV during the evening and watching TV during the day). As another example, determining the first context may include the processor 80 and/or the processor 180 determining one or more of a time of day, a day of the week, a location, a user activity, or presence of a user. As another example, the method 350 may further include the processor 80 and/or the processor 180 providing an indication of the second context to a user of a receiving wireless communication device that received the first radio-frequency signals and the second radio-frequency signals, or taking a user-defined action based on the second context, or a combination of these.

Also or alternatively, the method 350 may further include sending, using a short-range wireless communication technique, the reference characteristic values, the test characteristic values, or a combination of these, directly between wireless communication devices each configured to determine the reference characteristic values from the first radio-frequency signals. For example, the method 350 may include the TV 48 sending the reference characteristic values and/or the test characteristic values to the tablet 44 using BLUETOOTH® wireless technology (e.g., using the processor 80 and the transceiver 88 of each of the TV 48 and the tablet 44). The sent values may be used, for example, to determine and/or re-determine profiles, including clustered profiles.

Also or alternatively, the method 350 may further include taking an action in response to the plurality of test characteristic values differing from the plurality of reference characteristic values by more than a threshold amount. For example, the method 350 may include sending alerts, sounding alarms, turning a device ON or OFF, one or more other actions, multiple ones of these actions, or combinations of these. The method 350 may further include making an environment-change determination that the test characteristic values differ from the reference characteristic values by more than the threshold amount; and requesting, in response to making the environment-change determination, a neighbor wireless communication device to determine confirmation characteristic values of the second radio-frequency signals, the neighbor wireless communication device being within communication range of a receiving wireless communication device that received the first radio-frequency signals and the second radio-frequency signals. Thus, the processor 80 may request a nearby device to help confirm that a difference exists between the reference and test characteristics, e.g., between an expected environmental state and an actual environmental state.

Figure 10:
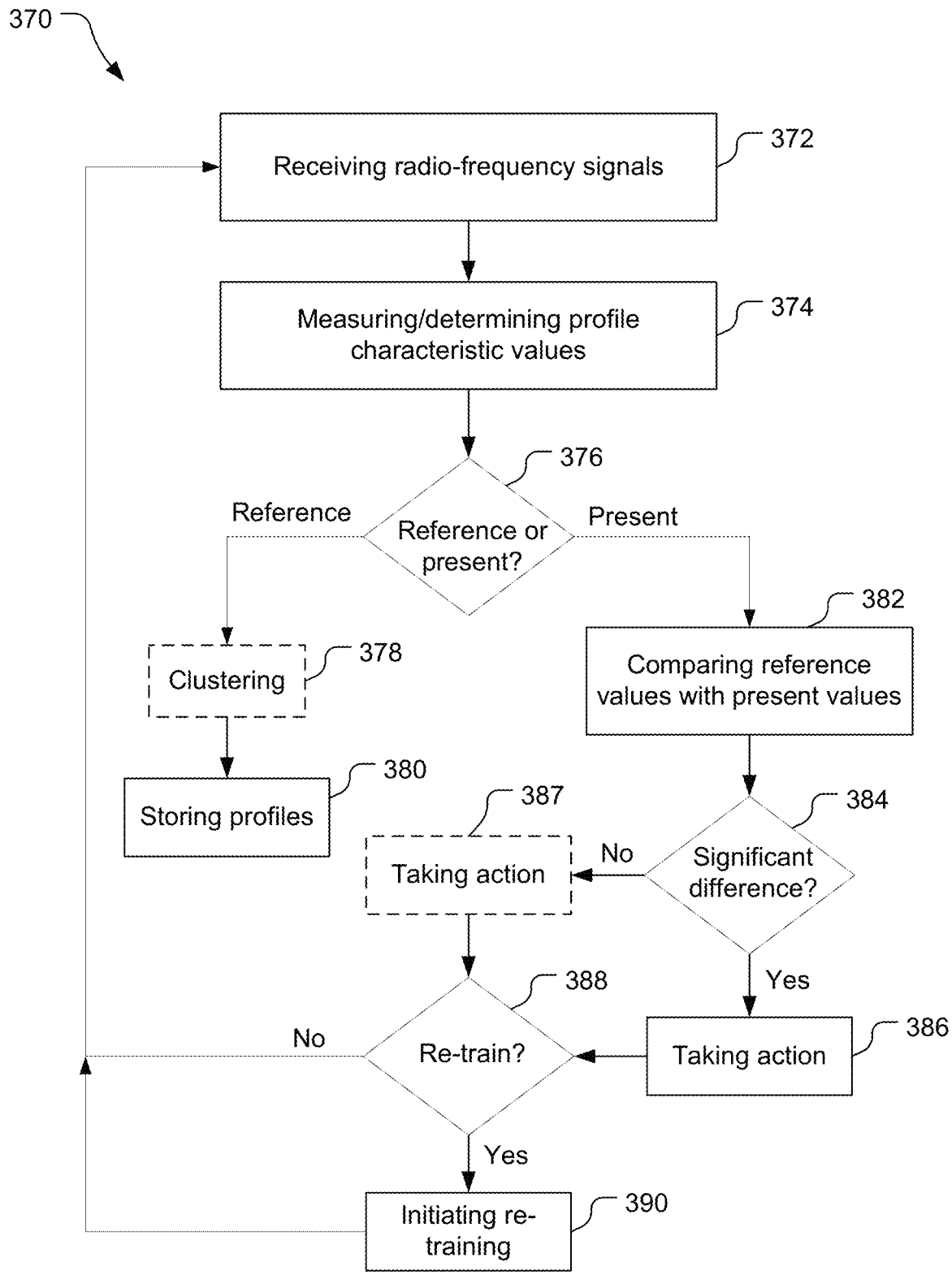
FIG. 10 is a block flow diagram of another method of analyzing characteristic values corresponding to radio-frequency signals.

Referring to FIG. 10, with further reference to FIGS. 1-9, a method 370 of analyzing characteristic values corresponding to RF signals includes the stages shown. The method 370 is, however, an example only and not limiting. The method 370 may be altered, e.g., by having stages added, removed, rearranged, combined, performed concurrently, and/or having single stages split into multiple stages. For simplicity, the discussion below refers to the wireless communication device 70 and/or components thereof for some stages, but this discussion of these stages may be applied to the controller 60, or a combination of the wireless communication device 70 and the controller 60 or a combination of multiple wireless communication devices 70 and the controller 60. Similarly, the discussion below refers to the controller and/or components thereof for some stages, but this discussion of these stages may be applied to the wireless communication device 70, or a combination of the wireless communication device 70 and the controller 60 or a combination of multiple wireless communication devices 70 and the controller 60.

At stage 372, the method 370 includes receiving radio-frequency signals. For example, the method 370 includes the transceiver 88 receiving radio-frequency signals from another wireless communication device. The signals received may be sent by the other wireless communication device without being induced by the processor 80, or may be sent in response to a communication sent by the processor 80 via the transceiver 88 (e.g., for determining an RTT value).

At stage 374, the method 370 includes measuring/determining profile characteristic values. For example, the method 370 may include the sensor(s) 96 and/or the processor 80 measuring and/or determining values such as RTT values, RSSI values, device IDs, RF channel characteristic values, latencies, etc. using the received signals. The stages 372, 374 provide an example of the stage 352 shown in FIG. 9 for obtaining reference characteristic values corresponding to radio-frequency signals and of the stage 354 shown in FIG. 9 for obtaining test characteristic values.

At stage 376, the method 370 includes determining whether the profile characteristic values from stage 374 are reference characteristic values or test characteristic values. For example, the processor 80 may determine that the profile characteristic values are reference characteristic values if no reference characteristic values are presently stored having a contexts corresponding to a determined context of the profile characteristic values from stage 374. As another example, the processor 80 may determine that the profile characteristic values are reference characteristic values if less than a desired amount of profile characteristic values have been clustered to determine a presently-stored profile of reference characteristic values corresponding to the determined context of the profile characteristic values from stage 374. As another example, the processor 80 may determine that the profile characteristic values are reference characteristic values if less than a desired amount of profile characteristic values have been clustered to determine a presently-stored profile of reference characteristic values corresponding to the determined context of the profile characteristic values from stage 374, and less than a reference/test threshold amount of time has passed. Further, the processor 80 may determine that the profile characteristic values are test characteristic values if reference characteristic values are presently stored and, if clustering has been used, have been determined by clustering a sufficient number of reference characteristic values. If it is determined that the profile characteristic values from stage 374 are test characteristic values, then the method 370 proceeds to stage 382 discussed below. If it is determined that the profile characteristic values from stage 374 are reference characteristic values, then the method 370 proceeds to stage 378.

At stage 378, the method 370 may include clustering of the reference characteristic values. For example, the method 370 may include the processor 80 combining (e.g., averaging) values of some of the profile characteristics for profiles having similar contexts and/or other similar characteristics (e.g., similar times of day and activity levels, or similar times of day, activity levels, and neighboring devices, etc.).

At stage 380, the method 370 includes storing profiles. For example, the method 370 may include the processor 80 storing the values of the characteristics of the profiles 610 and/or the profiles 710.

At stage 382, the method 370 includes comparing reference characteristic values with test characteristic values. For example, the method 370 may include the processor 180 of the controller 60 comparing characteristic values of what was determined in stage 376 to be a test profile with characteristic values of a corresponding reference profile stored at stage 380. The comparing performed by the controller 60 may include determining or selecting a reference profile with a context similar to the context of the test profile, and comparing characteristic values of the selected reference profile with corresponding characteristic values of the test profile. The test profile and the reference profile, however, may not have all of the same characteristic values. In this case, the processor and 180 may compare the characteristics that are shared by the test profile and reference profile, and note any additional and/or missing characteristic value from the test profile compared to the reference profile. The stage 382 is an example of the stage 356 shown in FIG. 9.

At stage 384, the method 370 includes determining whether a significant difference exists between the test characteristic values and the reference characteristic values. For example, the method 370 may include the processor 180 determining whether any test characteristic value lies outside of a corresponding reference characteristic value range. As another example, the method 370 may include the processor 180 determining whether an average difference of the test characteristic values relative to respective midpoints of the reference characteristic value ranges differs by more than a threshold amount. As another example, the method 370 may include the processor 180 determining whether any test characteristic value exists in the test profile without a corresponding reference characteristic value in the reference profile, or vice versa. As another example, the method 370 may include the processor 180 determining whether a particular combination of the test characteristic values have a particular combined difference relative to respective reference characteristic values (e.g., one particular test characteristic value being outside a corresponding reference characteristic value range, and another one of the test characteristic values differing from an average corresponding reference characteristic value range by more than a threshold amount, or an average difference being above a threshold). These are only examples, and not limiting, of the possible techniques for determining a significant difference between a test profile and a corresponding reference profile.

If it is determined that a significant difference between the test profile and the reference profile is not present (i.e., that the test profile and the reference profile are not significantly different), then the method 370 proceeds to stage 387 or to stage 388, discussed below. If it is determined that a significant difference between the test profile and reference profile is present (i.e., that the test profile and the reference profile are significantly different), then the method 370 proceeds to stage 386.

At stage 386, the method 370 includes taking action. For example, the method 370 may include the processor 180 taking an appropriate action in response to the determination of a significant difference between the test profile and the reference profile existing. As examples, the processor 180 may provide an alert to a user, sound an alarm, change a state of the device (e.g., from ON to OFF or vice versa), etc. The action taken by the processor 180 may be user dependent. For example, a user may have provided, and the processor 180 stored in the memory 182, input as to particular actions to be taken for responding to particular differences between test and reference profiles, and the processor 180 may take an indicated action in response to a corresponding particular difference being determined at stage 384. As another example, the processor 180 may ask, via the user interface 186, a user what action is to be taken in response to the difference determined at stage 384, and take the action indicated by the user. Also or alternatively, the action taken may depend on which characteristic(s) differed significantly and/or by how much. For example, what alarm is triggered and/or what information is provided and/or to whom may depend on what difference(s) triggered the action (e.g., texting a user with a notice that a burglary may be in progress if a television is moving). Also or alternatively, the action taken may depend on the context, e.g., notifying a user if the context has the user present or notifying an emergency service if the user is not present.

At optional stage 387, the method 370 includes taking action. Here, the method 370 may include the processor 180 taking an appropriate action in response to the determination that the test profile and the reference profile are not significantly different. For example, the controller 60 may take an action, such as turning on a light, triggering cooling of a room, triggering heating of a room, etc. if the test profile is within a threshold similarity of one of the stored profiles 710. The method 370 proceeds from stage 387 to stage 388. Alternatively, stage 387 is optional, and may be omitted from the method 370 such that the method 370 proceeds directly from stage 384 to stage 388 if there is no significant difference between the test profile and the reference profile.

At stage 388, the method 370 includes determining whether to re-train the reference characteristic values. For example, the stage 388 may include the processor 180 determining whether the reference characteristic values used in the comparison with the test characteristic values are to be re-learned. For example, the stage 388 may include the processor 180 determining that periodic re-learning of the reference characteristic values is in order due to the passage of a threshold amount of time. As another example, the stage 388 may include the processor 180 making a determination that a device within the system 10 has moved, and trigger the re-learning of the reference characteristic values in response to this determination. As another example, the stage 388 may include the processor 180 determining that a profile change has become static. As another example, the stage 388 may include the processor 180 determining that a context of the present characteristic values is lower than a threshold likelihood of being any of the contexts of saved profiles. As another example, the stage 388 may include the processor 180 inquiring of a user whether to re-learn the reference characteristic values. If it is determined at stage 388 not to re-train the reference characteristic values, then the method 370 returns to stage 372. If it is determined at stage 388 to re-train the reference surface of values, then the method 370 proceeds to stage 390.

At stage 390, the method 370 includes initiating retraining of the reference characteristic values. For example, the method 370 may include the processor 180 deleting the stored reference characteristic values from the memory 182. As another example, the method 370 may include the processor 180 setting a flag to use the next N (where $N \geq 1$) sets of received radio-frequency signals to update the stored reference characteristic values. For example, the reference characteristic values may be updated by combining the new sets of profile characteristic values determined from these radio-frequency signals with the existing reference characteristic values. As another example, the reference characteristic values may be updated by, for each new set of characteristic values, removing the oldest set of characteristic values used to determine the reference characteristic values, and then combining the new set of characteristic values with the remaining set(s) of characteristic values.

Figure 11:
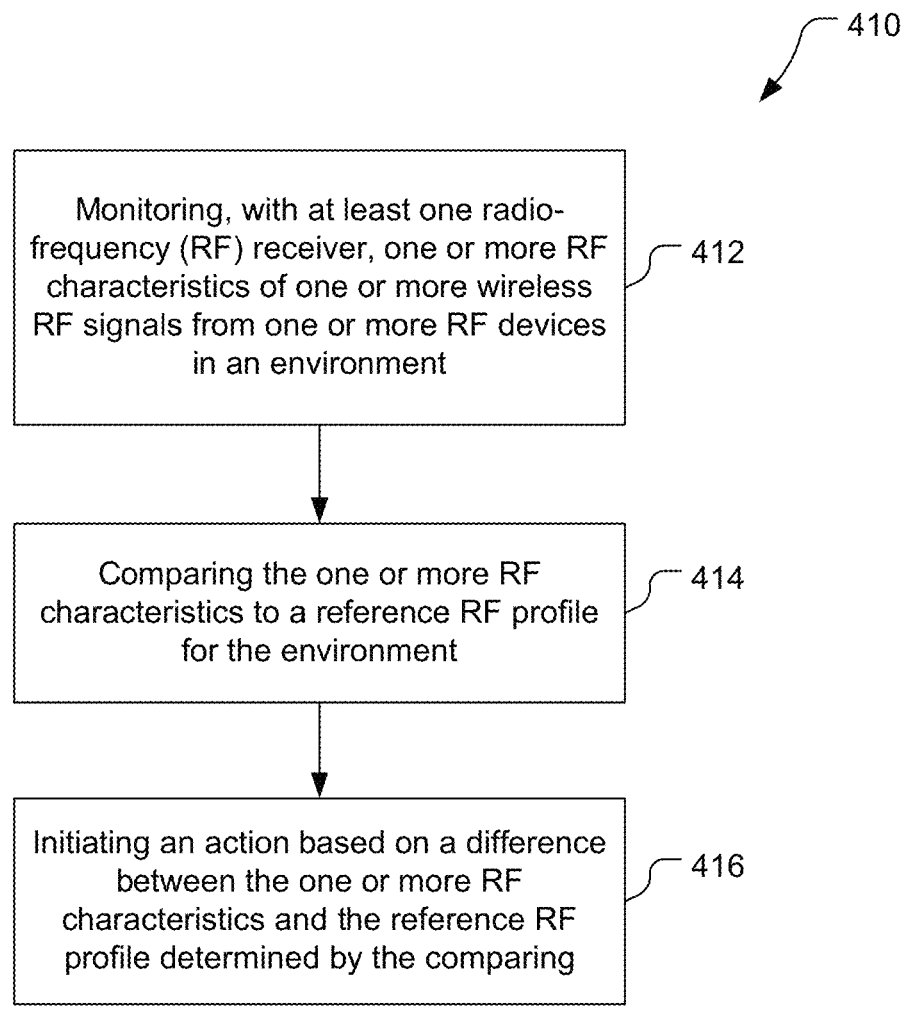
FIG. 11 is a block flow diagram of a method of using one or more radio-frequency signals.

Referring to FIG. 11, with further reference to FIGS. 1-8, a method 410 of using one or more radio-frequency signals includes the stages shown. The method 410 is, however, an example only and not limiting. The method 450 may be altered, e.g., by having stages added, removed, rearranged, combined, performed concurrently, and/or having single stages split into multiple stages.

At stage 412, the method 410 includes monitoring, with at least one radio-frequency (RF) receiver, one or more RF characteristics of one or more wireless RF signals from one or more RF devices in an environment. For example, stage 412 may include monitoring means monitoring one or more RF characteristics of one or more wireless RF signals from one or more RF devices in an environment. This may involve, for example, the processor 80 measuring (using the one or more of the sensor(s) 96) one or more RF signals and/or receiving one or more indications of one or more RF characteristics of one or more RF signals, and/or the central controller 60 and/or the server 30 receiving one or more indications of one or more RF characteristics of one or more RF signals. An indication may be of an RF characteristic itself or information from which the RF characteristic may be derived/determined.

At stage 414, the method 410 includes comparing the one or more RF characteristics to a reference RF profile for the environment. For example, stage 414 may include means for comparing, such as the processor 80 and/or the processor 180 (and/or the server 30 or other device), comparing the one or more RF characteristics to a reference RF profile, e.g., that the processor 80 retrieves from the memory 82 or that the processor 180 retrieves from the memory 182. The comparing may yield one or more differences between the one or more RF characteristics and the reference RF profile, e.g., an average variation (e.g., percentage) between each RF characteristic and each corresponding value in the reference RF profile, one or more indications of whether one or more RF characteristic values exceeded one or more corresponding thresholds, combinations of these, etc.

At stage 416, the method 410 includes initiating an action based on a difference between the one or more RF characteristics and the reference RF profile determined by the comparing. For example, stage 416 may include means for initiating, such as the processor 80 and/or the processor 180, sending alerts, sounding alarms, turning a device ON or OFF, one or more other actions, multiple ones of these actions, or combinations of these. Initiating the action may occur in response to the difference determined by the comparing being more than a threshold amount. The action initiated may include requesting a neighbor wireless communication device to determine a confirmation RF profile of one or more of the one or more RF characteristics of one or more of the one or more RF devices, the neighbor wireless communication device being within communication range of the at least one RF receiver. For example, the processor 80 may send a request via the transceiver 88 to a neighbor wireless communication device for confirmation of one or more RF characteristics, e.g., if one or more RF characteristics are different by more than one or more thresholds from corresponding values in the reference RF profile.

The method 410 may also, or alternatively, include one or more of the following features. The method 410 may include determining that a context of the one or more RF characteristics corresponds to a context of the reference RF profile, wherein comparing the one or more RF characteristics to the reference RF profile is performed in response to determining that the context of the one or more RF characteristics corresponds to the context of the reference RF profile. Determining the context of the one or more RF characteristics comprises determining one or more of a time of day, a day of the week, a location, a user activity, or presence of a user. Also or alternatively, the method 410 may include providing an indication of the context of the reference RF profile to a user of a receiving wireless communication device that includes the at least one RF receiver, or taking a user-defined action based on the context of the reference RF profile, or a combination of these. The one or more RF characteristics and the reference RF profile have a shared RF characteristic set that includes at least one signal characteristic, or at least one signal propagation characteristic, or a combination thereof.

Figure 12:
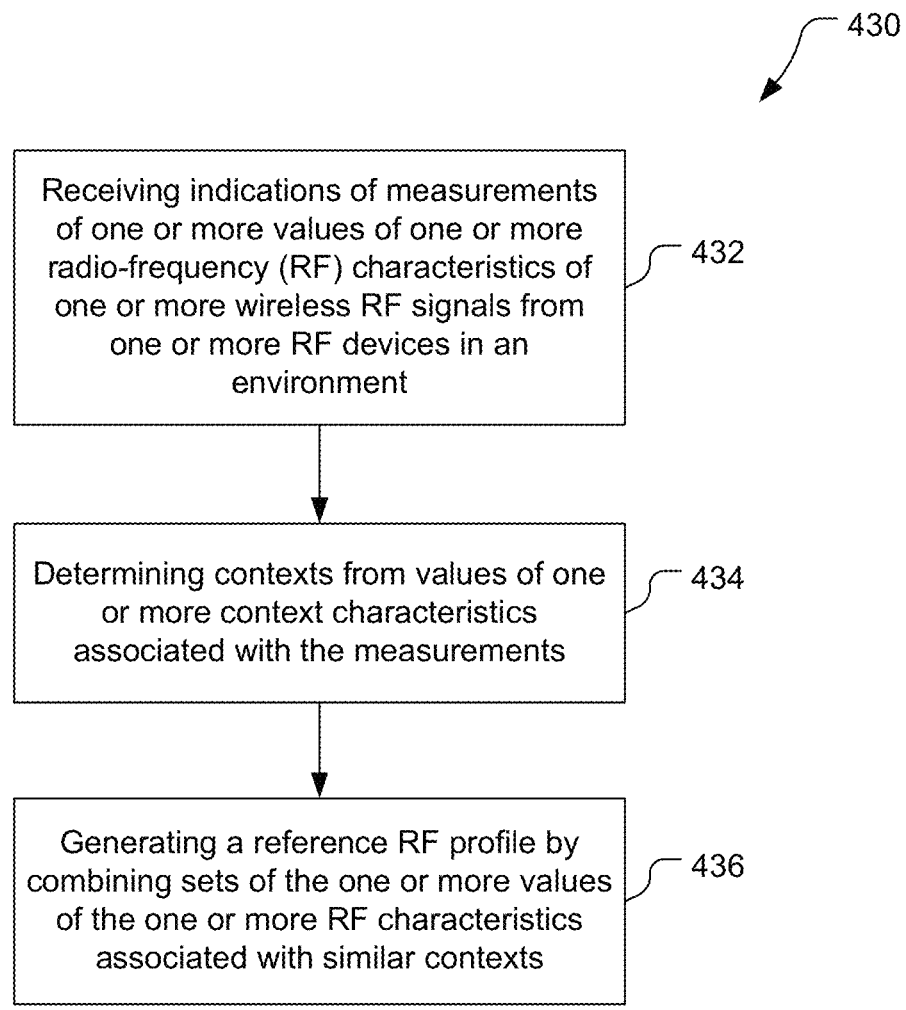
FIG. 12 is a block flow diagram of a method of generating a radio-frequency signal profile.

Referring to FIG. 12, with further reference to FIGS. 1-8, a method 430 of generating a radio-frequency signal profile includes the stages shown. The method 430 is, however, an example only and not limiting. The method 450 may be altered, e.g., by having stages added, removed, rearranged, combined, performed concurrently, and/or having single stages split into multiple stages.

At stage 432, the method 410 includes receiving indications of measurements of one or more values of one or more radio-frequency (RF) characteristics of one or more wireless RF signals from one or more RF devices in an environment. For example, stage 432 may include receiving means receiving the indications, which may involve, for example, the processor 80 measuring (using the one or more of the sensor(s) 96) one or more RF signals and/or receiving one or more indications of one or more RF characteristics of one or more RF signals, and/or the central controller 60 and/or the server 30 receiving one or more indications of one or more RF characteristics of one or more RF signals. An indication may be of an RF characteristic itself or information from which the RF characteristic may be derived/determined. Further, receiving the indications of measurements may include taking the measurements with at least one radio-frequency (RF) receiver.

At stage 434, the method 410 includes determining contexts from values of one or more context characteristics associated with the measurements. For example, stage 434 may include means for determining, such as the processor 80 and/or the processor 180 (and/or the server 30 or other device), determining common contexts for groups of measurements, with each of the contexts perhaps being one or more values indicative of a time of day, a day of the week, a location, a user activity, presence of a user, user vacation status, etc.

At stage 436, the method 430 includes generating a reference RF profile by combining sets of the one or more values of the one or more RF characteristics associated with similar contexts. For example, stage 436 may include means for generating, such as the processor 80 and/or the processor 180, and grouping RF characteristic values by context and storing the grouped RF characteristic values in association with an indication of the corresponding context.

The method 430 may also, or alternatively, include one or more of the following features. The method 430 may include maintaining the reference RF profile by updating the reference RF profile using one or more present values of the one or more RF characteristics. Updating the reference RF profile may be performed in response to: the one or more of the present values of the one or more RF characteristics differing from the reference RF profile by more than a threshold for more than a specified time; at least one of the RF devices moving more than a respective threshold distance; a present context corresponding to present values of the context characteristics being less than a threshold likeliness of being a previously-determined context; or a present RF profile, corresponding to the one or more present values of the RF characteristics, differing by more than a first threshold amount from the reference RF profile and less than a second threshold amount from a previously-determined present RF profile that also differed from the reference RF profile by more than the first threshold amount; or a combination of two or more of these. One or more of the present values of the one or more RF characteristics differing from the reference RF profile by more than a threshold for more than a specified time may involve different measurements of one characteristic differing by more than the threshold or different measurements each exceeding a respective threshold, or a combination of measurements exceeding a combination threshold, for at least the time period.

Also or alternatively, the method 430 may include sending, using a short-range wireless communication technique, the one or more values of the one or more RF characteristics, one or more values of one or more RF characteristics of the reference RF profile, or a combination of these, directly between wireless communication devices each configured to determine the one or more values of the one or more RF characteristics. Thus, wireless communication devices may share information in order to determine one or more RF characteristics for the reference RF profile.

OTHER CONSIDERATIONS

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, an indication that a device is configured to perform a stated function means that the device contains appropriate equipment (e.g., circuitry, mechanical device(s), hardware, software (e.g., processor-readable instructions), firmware, etc.) to perform the stated function. That is, the device contains equipment that is capable of performing the stated function, e.g., with the device itself having been designed and made to perform the function, or having been manufactured such that the device includes equipment that was designed and made to perform the function. An indication that processor-readable instructions are configured to cause a processor to perform functions means that the processor-readable instructions contain instructions that when executed by a processor (after compiling as appropriate) will result in the functions being performed.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, a wireless communication device may communicate through one or more wired connections as well as through one or more wireless connections.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other non-transitory medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. A method of using one or more radio-frequency signals, the method comprising:
obtaining, with at least one radio-frequency (RF) receiver, one or more measurements of one or more RF characteristics of one or more wireless RF signals from one or more RF devices in an environment;
determining, based on one or more context characteristics including at least one context characteristic other than location, that a first context of the one or more measurements corresponds to a second context of a reference RF profile;
in response to the determining, comparing the one or more measurements characteristics to one or more corresponding reference values in the reference RF profile; and
initiating an action based on a difference between the one or more measurements and the one or more corresponding reference values in the reference RF profile determined by the comparing.

2. The method of claim 1, wherein the first context of the one or more measurements comprises one or more of a time of day, a day of the week, a location, a user activity, or presence of a user.

3. The method of claim 1, further comprising:
providing an indication of the second context of the reference RF profile to a user of a receiving wireless communication device that includes the at least one RF receiver; or
taking a user-defined action based on the context of the reference RF profile; or
a combination of these.

4. The method of claim 1, wherein the one or more measurements and the reference RF profile have a shared RF measurement characteristic set that includes at least one signal measurement, or at least one signal propagation measurement, or a combination thereof.

5. The method of claim 1, wherein initiating the action occurs in response to the difference determined by the comparing being more than a threshold amount.

6. The method of claim 5, wherein the action includes requesting a neighbor wireless communication device to determine a confirmation RF profile of one or more of the one or more measurements of one or more of the one or more RF devices, the neighbor wireless communication device being within communication range of the at least one RF receiver.

7. The method of claim 1, further comprising maintaining the reference RF profile by updating the reference RF profile using one or more values of the one or more measurements.

8. The method of claim 1, wherein the one or more measurements include a round-trip time, or a received signal strength, or channel characteristics, or a latency, or a combination thereof.

9. A wireless mobile communication device comprising:
a memory;
a transceiver; and
a processor communicatively coupled to the memory and to the transceiver and configured to:
obtain, via at least one radio-frequency (RF) receiver of the transceiver, one or more measurements of one or more RF characteristics of one or more wireless RF signals from one or more RF devices in an environment;
determine, based on one or more context characteristics including at least one context characteristic other than location, whether a first context of the one or more measurements corresponds to a second context of a reference RF profile;
compare, in response to the first context of the one or more measurements corresponding to the second context of the reference profile, the one or more measurements to one or more corresponding reference values in the reference RF profile; and
initiate an action based on a difference between the one or more measurements and the one or more corresponding reference values in the reference RF profile.

10. The device of claim 9, wherein the first context of the one or more measurements comprises one or more of a time of day, a day of the week, a location, a user activity, or presence of a user.

11. The device of claim 9, wherein the processor is further configured to:
provide an indication of the second context of the reference RF profile to a user of the wireless mobile communication device; or
take a user-defined action based on the context of the reference RF profile; or
a combination of these.

12. The device of claim 9, wherein the processor is configured to select the reference RF profile for comparison to the one or more measurements such that the one or more measurements and the reference RF profile have a shared measurement set that includes at least one signal measurement, or at least one signal propagation measurement, or a combination thereof.

13. The device of claim 9, wherein the processor is configured to initiate the action in response to the difference between the one or more measurements and the reference RF profile being more than a threshold amount.

14. The device of claim 13, wherein the action includes requesting a neighbor wireless communication device to determine a confirmation RF profile of one or more of the one or more measurements of one or more of the one or more RF devices.

15. The device of claim 9, wherein the processor is further configured to maintain the reference RF profile by updating the reference RF profile using one or more values of the one or more measurements.

16. The device of claim 9, wherein the one or more measurements include a round-trip time, or a received signal strength, or channel characteristics, or a latency, or a combination thereof.

17. A wireless mobile communication device comprising:
means for obtaining one or more radio-frequency (RF) measurements or one or more RF characteristics of one or more wireless RF signals from one or more RF devices in an environment;
means for determining, based on one or more context characteristics including at least one context characteristic other than location, whether a first context of the one or more measurements corresponds to a second context of a reference RF profile;

means for comparing, in response to the first context of the one or more measurements corresponding to the second context of the reference profile, the one or more measurements to one or more corresponding reference values in the reference RF profile; and means for initiating an action based on a difference between the one or more measurements and the one or more corresponding reference values in the reference RF profile determined by the means for comparing.

18. The device of claim 17, wherein the first context of the one or more measurements comprises one or more of a time of day, a day of the week, a location, a user activity, or presence of a user.

19. The device of claim 17, further comprising:
means for providing an indication of the second context of the reference RF profile to a user of the wireless mobile communication device; or means for taking a user-defined action based on the context of the reference RF profile; or a combination of these.

20. The device of claim 17, further comprising means for selecting the reference RF profile for comparison to the one or more measurements such that the one or more measurements and the reference RF profile have a shared RF measurement set that includes at least one signal measurement, or at least one signal propagation measurement, or a combination thereof.

21. The device of claim 17, wherein the means for initiating are configured to initiate the action in response to the difference between the one or more measurements and the RF profile being more than a threshold amount.

22. The device of claim 21, wherein the means for initiating the action are configured to request a neighbor wireless communication device to determine a confirmation RF profile of one or more of the one or more measurements one or more of the one or more RF devices.

23. The device of claim 17, further comprising means for maintaining the reference RF profile by updating the reference RF profile using one or more values of the one or more measurements.

24. The device of claim 17, wherein the one or more measurements include a round-trip time, or a received signal strength, or channel characteristics, or a latency, or a combination thereof.

25. A non-transitory, processor-readable storage medium comprising instructions configured to cause a processor to:
obtain, via at least one radio-frequency (RF) receiver, one or more measurements of one or more RF characteristics of one or more wireless RF signals from one or more RF devices in an environment;

determine, based on one or more context characteristics including at least one context characteristic other than location, whether a first context of the one or more measurements corresponds to a second context of a reference RF profile;

compare, in response to the first context of the one or more measurements corresponding to the second context of the reference profile, the one or more measurements to one or more corresponding reference values in the reference RF profile; and initiate an action based on a difference between the one or more measurements and the one or more corresponding reference values in the reference RF profile.

26. The storage medium of claim 25, wherein the first context of the one or more measurements comprises one or more of a time of day, a day of the week, a location, a user activity, or presence of a user.

27. The storage medium of claim 25, further comprising instructions configured to cause the processor to:
provide an indication of the second context of the reference RF profile to a user of the wireless mobile communication device; or take a user-defined action based on the context of the reference RF profile; or a combination of these.

28. The storage medium of claim 25, further comprising instructions configured to cause the processor to select the reference RF profile for comparison to the one or more measurements such that the one or more measurements and the reference RF profile have a shared RF measurement set that includes at least one signal measurement, or at least one signal propagation measurement, or a combination thereof.

29. The storage medium of claim 25, wherein the instructions configured to cause the processor to initiate the action are configured to cause the processor to initiate the action in response to the difference between the one or more measurements and the reference RF profile being more than a threshold amount.

30. The storage medium of claim 29, wherein the action includes requesting a neighbor wireless communication device to determine a confirmation RF profile of one or more of the one or more measurements of one or more of the one or more RF devices.

31. The storage medium of claim 25, further comprising instructions configured to cause the processor to maintain the reference RF profile by updating the reference RF profile using one or more values of the one or more measurements.

32. The storage medium of claim 25, wherein the one or more measurements include a round-trip time, or a received signal strength, or channel characteristics, or a latency, or a combination thereof.

33. A method of generating a radio-frequency signal profile, the method comprising:
receiving indications of two or more measured values of two or more radio-frequency (RF) characteristics of one or more wireless RF signals from one or more RF devices in an environment;

determining contexts from values of one or more context characteristics associated with the measured values, the one or more context characteristics including at least one context characteristic other than location; and generating a reference RF profile comprising at least two profile values each being one of the two or more measured values of the one or more RF signals and each being associated with a similar one of the contexts.

34. The method of claim 33, further comprising maintaining the reference RF profile by updating the reference RF profile using one or more present values of the two or more measured values.

35. The method of claim 34, wherein the updating the reference RF profile is performed in response to:
the one or more present values of the two or more measured values differing from the reference RF profile by more than a threshold for more than a specified time;

at least one of the RF devices moving more than a respective threshold distance;

a present context corresponding to present values of the context characteristics being less than a threshold likeliness of being a previously-determined context; or a present RF profile, corresponding to the one or more present values of the two or more measured values, differing by more than a first threshold amount from the reference RF profile and less than a second threshold amount from a previously-determined present RF profile that also differed from the reference RF profile by more than the first threshold amount; or a combination of two or more of these.

36. The method of claim 33, wherein the context characteristics comprise one or more of a time of day, a day of the week, a location, a user activity, or presence of a user.

37. The method of claim 33, further comprising sending, using a short-range wireless communication technique, the two or more measured values, one or more of the profile values, or a combination of these, directly between wireless communication devices each configured to determine the two or more measured values.

38. The method of claim 33, wherein receiving the indications of the two or more measured values comprises measuring the one or more wireless RF signals with at least one radio-frequency (RF) receiver.

39. The method of claim 33, further comprising storing the reference RF profile in a memory with the at least two profile values associated with each other and with the similar one of the contexts.

40. A device comprising:
a memory;
a processor, communicatively coupled to the memory, configured to:
  receive indications of two or more measured values of two or more wireless radio-frequency (RF) characteristics of one or more wireless RF signals from one or more RF devices in an environment;
  determine contexts from values of one or more context characteristics associated with the measured values, the one or more context characteristics including at least one context characteristic other than location; and
  generate a reference RF profile comprising at least two profile values each being one of the two or more measured values of the one or more RF signals and each being associated with a similar one of the contexts.

41. The device of claim 40, wherein the processor is further configured to maintain the reference RF profile by updating the reference RF profile using one or more new values of the two or more measured values.

42. The device of claim 41, wherein the processor is configured to update the reference RF profile in response to:
the one or more new values of the two or more measured values differing from the reference RF profile by more than a threshold for more than a specified time;
at least one of the RF devices moving more than a respective threshold distance;
a new context corresponding to new values of the context characteristics being less than a threshold likeliness of being a previously-determined context; or
a new RF profile, corresponding to the one or more new values of the two or more measured values, differing by more than a first threshold amount from the reference RF profile and less than a second threshold amount from a previously-determined present RF profile that also differed from the reference RF profile by more than the first threshold amount; or
a combination of two or more of these.

43. The device of claim 40, wherein the context characteristics comprise one or more of a time of day, a day of the week, a location, a user activity, or presence of a user.

44. The device of claim 40, further comprising a transmitter communicatively coupled to the processor, wherein the processor is further configured to send, via the transmitter using a short-range wireless communication technique, the two or more measured values, one or more of the profile values, or a combination of these, directly to a wireless communication device.

45. The device of claim 40, further comprising at least one RF receiver communicatively coupled to the processor, wherein the processor is configured to receive the indications of the two or more measured values via the at least one RF receiver.

46. A device comprising:
means for receiving indications of two or more measured values of two or more radio-frequency (RF) characteristics of one or more wireless RF signals from one or more RF devices in an environment;
means for determining contexts from values of one or more context characteristics associated with the measured values, the one or more context characteristics including at least one context characteristic other than location; and
means for generating a reference RF profile comprising at least two profile values each being one of the two or more measured values of the one or more RF signals and each being associated with a similar one of the contexts.

47. The device of claim 46, further comprising means for maintaining the reference RF profile by updating the reference RF profile using one or more present values of the two or more measured values.

48. The device of claim 47, wherein the means for updating the reference RF profile are configured to update the reference RF profile in response to:
the one or more present values of the two or more measured values differing from the reference RF profile by more than a threshold for more than a specified time;
at least one of the RF devices moving more than a respective threshold distance;
a present context corresponding to present values of the context characteristics being less than a threshold likeliness of being a previously-determined context; or
a present RF profile, corresponding to the one or more present values of the two or more measured values, differing by more than a first threshold amount from the reference RF profile and less than a second threshold amount from a previously-determined present RF profile that also differed from the reference RF profile by more than the first threshold amount; or
a combination of two or more of these.

49. The device of claim 46, wherein the context characteristics comprise one or more of a time of day, a day of the week, a location, a user activity, or presence of a user.

50. The device of claim 46, further comprising means for sending, using a short-range wireless communication technique, the two or more measured values, one or more of the profile values, or a combination of these, directly to a wireless communication device.

51. The device of claim 46, wherein the means for receiving the indications of the two or more measured values comprise means for measuring the one or more wireless RF signals with at least one radio-frequency (RF) receiver.

52. A non-transitory, processor-readable storage medium comprising instructions configured to cause a processor to:
receive indications of two or more measured values of two or more radio-frequency (RF) characteristics of one or more wireless RF signals from one or more RF devices in an environment;

determine contexts from values of one or more context characteristics associated with the measured values, the one or more context characteristics including at least one context characteristic other than location; and generate a reference RF profile comprising at least two profile values each being one of the two or more measured values of the one or more RF signals and each being associated with a similar one of the contexts.

53. The storage medium of claim 52, further comprising instructions configured to cause the processor to maintain the reference RF profile by updating the reference RF profile using one or more new values of the two or more measured values.

54. The storage medium of claim 53, wherein the instructions configured to cause the processor to update the reference RF profile are configured to cause the processor to update the reference RF profile in response to:

the one or more new values of the two or more measured values differing from the reference RF profile by more than a threshold for more than a specified time;

at least one of the RF devices moving more than a respective threshold distance;

a new context corresponding to new values of the context characteristics being less than a threshold likeliness of being a previously-determined context; or a new RF profile, corresponding to the one or more new values of the two or more measured values, differing by more than a first threshold amount from the reference RF profile and less than a second threshold amount from a previously-determined present RF profile that also differed from the reference RF profile by more than the first threshold amount; or a combination of two or more of these.

55. The storage medium of claim 52, wherein the context characteristics comprise one or more of a time of day, a day of the week, a location, a user activity, or presence of a user.

56. The storage medium of claim 52, further comprising instructions configured to cause the processor to send, via a transmitter using a short-range wireless communication technique, the two or more measured values, one or more of the profile values, or a combination of these, directly to a wireless communication device.

57. The storage medium of claim 52, wherein the instructions configured to cause the processor to receive the indications of the two or more measured values are configured to cause the processor to receive the indications of the two or more measured values via at least one RF receiver.

* * * * *